United States Patent
Koike et al.

(10) Patent No.: US 10,317,599 B2
(45) Date of Patent: Jun. 11, 2019

(54) WAVELENGTH PLATE AND OPTICAL DEVICE

(71) Applicant: DEXERIALS CORPORATION, Tokyo (JP)

(72) Inventors: Nobuyuki Koike, Tokyo (JP); Masatoshi Sasaki, Tokyo (JP); Akio Takada, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 225 days.

(21) Appl. No.: 15/070,702

(22) Filed: Mar. 15, 2016

(65) Prior Publication Data
US 2016/0274287 A1    Sep. 22, 2016

(30) Foreign Application Priority Data
Mar. 19, 2015  (JP) ................................. 2015-055622

(51) Int. Cl.
G02B 5/30    (2006.01)
G02F 1/09    (2006.01)
G02B 27/28   (2006.01)

(52) U.S. Cl.
CPC ......... *G02B 5/3083* (2013.01); *G02B 27/288* (2013.01); *G02F 1/093* (2013.01)

(58) Field of Classification Search
CPC .... G02B 5/3083; G02B 5/3091; G02B 27/28; G02B 27/286; G02B 27/288; G02F 1/09; G02F 1/093; G02F 1/095; G02F 1/0955
See application file for complete search history.

(56) References Cited

U.S. PATENT DOCUMENTS 8,477,272 B2 * 7/2013 Oto ................ G02B 5/3083
                                               349/117
2005/0249890 A1   11/2005 Murakami et al.
(Continued)

FOREIGN PATENT DOCUMENTS

JP   63-132203 A   6/1988
JP   10-066816 A   3/1998
(Continued)

OTHER PUBLICATIONS

JP 2007-093963, English language machine translation, generated via J-Plat Pat on Jan. 8, 2017.*

(Continued)

*Primary Examiner* — Stephone B Allen
*Assistant Examiner* — Adam W Booher
(74) *Attorney, Agent, or Firm* — Pergament & Cepeda LLP; Milagros A. Cepeda; Edward D. Pergament

(57) ABSTRACT

A wavelength plate, wherein first birefringent layer and second birefringent layer are laminated such that in-plane directions of optical axes of first birefringent layer and second birefringent layer cross each other, wherein the wavelength plate satisfies formulae (1), (2), (3), and (4), and wherein at least one of first birefringent layer and second birefringent layer is obliquely-deposited birefringent layer formed by oblique deposition, $$\Delta n1 \times t1 = \lambda/2 \tag{1}$$

$$1.7 \leq (\Delta n1 \times t1)/(\Delta n2 \times t2) \leq 2.7 \tag{2}$$

$$5° \leq \theta1 \leq 30° \tag{3}$$

$$(2\theta1+35°) \leq \theta2 \leq (2\theta1+50°) \tag{4}$$

where $\Delta n1$ represents birefringence of first birefringent layer, $\Delta n2$ represents birefringence of second birefrin-
(Continued)

gent layer, t1 represents a film thickness of first birefringent layer, t2 represents a film thickness of second birefringent layer, θ1 represents angle between optical axis of first birefringent layer and incident linearly polarized light, θ2 represents angle between optical axis of second birefringent layer and incident linearly polarized light, and λ represents a predetermined value in a range of wavelengths of incident light.

20 Claims, 21 Drawing Sheets

(56) References Cited

U.S. PATENT DOCUMENTS

| | | | |
|---|---|---|---|
| 2012/0295069 A1* | 11/2012 | Koike | C23C 14/083 428/172 |
| 2016/0054500 A1 | 2/2016 | Koike | |

FOREIGN PATENT DOCUMENTS

| | | | |
|---|---|---|---|
| JP | 11-023840 | A | 1/1999 |
| JP | 11-231132 | A | 8/1999 |
| JP | 2000-356711 | A | 12/2000 |
| JP | 2007-093963 | A | 4/2007 |
| JP | 4534706 | B2 | 9/2010 |
| JP | 4708787 | B2 | 6/2011 |
| JP | 5191447 | B2 | 5/2013 |
| JP | 2014-219672 | A | 11/2014 |

OTHER PUBLICATIONS

Decision of Refusal mailed by the Japanese Patent Office dated May 23, 2017, for corresponding Patent Application No. JP 2015-055622, and English translation.

Notice of Reasons for Rejection mailed by the Japanese Patent Office dated Jan. 31, 2017, for corresponding Patent Application No. JP 2015-055622.

* cited by examiner

WAVELENGTH PLATE AND OPTICAL DEVICE

CROSS-REFERENCE TO RELATED APPLICATION

This application claims priority to Japanese application No. 2015-055622, filed on Mar. 19, 2015, which is hereby incorporated herein by reference in its entirety.

BACKGROUND OF THE INVENTION

Field of the Invention
The present invention relates to a wavelength plate and an optical device.

Description of the Related Art
Wavelength plates are elements configured to impart a specific retardation to light, and those that are the most commonly used are half wavelength plates and quarter wavelength plates. These wavelength plates are mounted on many optical devices.

Various studies have been conducted in order to obtain wide-band wavelength plates, and various multilayer wavelength plates obtained by laminating wavelength plates one over another have been proposed in order to obtain, for example, wide-band quarter wavelength plates. For example, there has been proposed a wavelength plate obtained by bonding three wavelength plates made of inorganic optical single crystals such as quartz crystals (see, e.g., Japanese Patent (JP-B) No. 4534706). There has also been proposed a wavelength plate obtained by bonding a quarter wavelength plate and a half wavelength plate that are made of organic materials such as stretched polymer films (see, e.g., Japanese Patent Application Laid-Open (JP-A) No. 10-68816 and JP-B Nos. 5191447 and 4708787).

However, JP-B No. 4534706 uses an adhesive for bonding the crystal plates, which raises a risk that the adhesive may deteriorate from a long time of use, which is disadvantageous in terms of heat resistance and durability. Further, the degree of retardation by the quartz-crystal wavelength plate is greatly varied depending on the angle of incident light, which raises problems that so-called angle-dependency of the wavelength plate is poor, and that the wavelength plate may not be able to adapt to expansion of the angular range of light used in recent optical devices.

Further, the stretched polymer films of JP-A No. 10-68816, JP-B No. 5191447, or JP-B No. 4708787 have a problem in durability because of a weak resistance to heat and UV light rays. This is disadvantageous for apparatuses and projectors that use a light source having a high light intensity such as a laser light source and are hence required to have resistance to heat and light.

Meanwhile, there has also been proposed a wavelength plate obtained by laminating birefringent layers formed by oblique deposition (see, e.g., JP-A No. 11-23840).

Incidentally, quarter wavelength plates are used in optical isolator optical systems, Serunamon optical systems, optical pickups, polarimetric interferometers, reflective liquid crystal projectors, etc. Among these, optical isolator optical systems, polarimetric interferometers, and reflective liquid crystal projectors make linearly polarized light that has once transmitted through the quarter wavelength plate be reflected on a mirror, a liquid crystal panel, or the like and make the reflected light transmit through the same quarter wavelength plate again. That is, these devices make the quarter wavelength plate function as a half wavelength plate by making light pass through the quarter wavelength plate twice. By this, when linearly polarized light becomes incident, these devices aim to obtain the linearly polarized light that has been rotated by 90° through two passages before and after the reflection. However, a wavelength plate that functions as, for example, a wide-band quarter wavelength plate may not necessarily be able to efficiently obtain linearly polarized light that has been rotated by 90° by two passages through the wavelength plate. Hence, in consideration of application to optical isolator optical systems and the like, there is a need for a wavelength plate having a high emission rate of linearly polarized light that has been rotated by 90° when linearly polarized light has passed through the wavelength plate twice in a reciprocating manner, i.e., a wavelength plate having a good conversion efficiency.

However, there has not been provided a wavelength plate that overcomes all of the problems described above, and even the wavelength plate of JP-A No. 11-23840 mentioned above cannot be said to be satisfactory in capability of exhibiting a high conversion efficiency (see the result of Comparative Example 2 in which an experiment was conducted based on the embodiment of JP-A No. 11-23840 in the EXAMPLES section below). Moreover, JP-A No. 11-23840 has a risk of cost increase because two or more kinds of birefringent materials are required, and selectivity of the materials is limited because there is a regulation for the relationship between wavelength dispersion and retardation of each birefringent material.

Hence, there is a need for an inorganic wide-band quarter wavelength plate having excellent heat resistance, a high conversion efficiency when light has passed through the wavelength plate twice in a reciprocating manner, and a small variation in the degree of retardation depending on the angle of incident light.

SUMMARY OF THE INVENTION

The present invention aims to overcome the various conventional problems described above and achieve an object described below. That is, an object of the present invention is to provide an inorganic wide-band quarter wavelength plate having excellent heat resistance, a high conversion efficiency when light has passed through the wavelength plate twice in a reciprocating manner, and a small variation in the degree of retardation depending on the angle of incident light.

In one aspect, the present application provides a means for solving the problems described above by providing.

A wavelength plate, including:
a first birefringent layer; and
a second birefringent layer,
the first birefringent layer and the second birefringent layer being laminated such that an in-plane direction of an optical axis of the first birefringent layer and an in-plane direction of an optical axis of the second birefringent layer cross each other,
wherein the wavelength plate satisfies formulae (1), (2), (3), and (4) below, and
wherein at least one birefringent layer of the first birefringent layer and the second birefringent layer is an obliquely-deposited birefringent layer formed by oblique deposition, $$\Delta n1 \times t1 = \lambda/2 \tag{1}$$

$$1.7 \leq (\Delta n1 \times t1)/(\Delta n2 \times t2) \leq 2.7 \tag{2}$$

$$5° \leq \theta1 \leq 30° \tag{3}$$

$$(2\theta1 + 35°) \leq \theta2 \leq (2\theta1 + 50°) \tag{4}$$

where Δn1 represents birefringence of the first birefringent layer, Δn2 represents birefringence of the second birefringent layer, t1 represents a film thickness of the first birefringent layer, t2 represents a film thickness of the second birefringent layer, θ1 represents an angle between the optical axis of the first birefringent layer and incident linearly polarized light, θ2 represents an angle between the optical axis of the second birefringent layer and incident linearly polarized light, and λ represents a predetermined value in a range of wavelengths of incident light.

In one variant, the present invention provides the wavelength plate according to the present invention wherein the wavelength plate is used in a mode that the incident linearly polarized light is incident from the first birefringent layer.

In one aspect, the present application a wavelength plate, including:

a first birefringent layer; and a second birefringent layer, the first birefringent layer and the second birefringent layer being laminated such that an in-plane direction of an optical axis of the first birefringent layer and an in-plane direction of an optical axis of the second birefringent layer cross each other, wherein the wavelength plate satisfies formulae (8), (9), (10), and (11) below, and wherein at least one birefringent layer of the first birefringent layer and the second birefringent layer is an obliquely-deposited birefringent layer formed by oblique deposition, $$\Delta n1 \times t1 = \lambda/4 \tag{8}$$

$$1.5 \leq (\Delta n2 \times t2)/(\Delta n1 \times t1) \leq 2.6 \tag{9}$$

$$5° \leq \theta2 \leq 30° \tag{10}$$

$$(2\theta2+35°) \leq \theta1 \leq (2\theta2+50°) \tag{11}$$

where Δn1 represents birefringence of the first birefringent layer, Δn2 represents birefringence of the second birefringent layer, t1 represents a film thickness of the first birefringent layer, t2 represents a film thickness of the second birefringent layer, θ1 represents an angle between the optical axis of the first birefringent layer and incident linearly polarized light, θ2 represents an angle between the optical axis of the second birefringent layer and incident linearly polarized light, and λ represents a predetermined value in a range of wavelengths of incident light.

In one variant, the present invention provides the wavelength plate according to the present invention wherein the wavelength plate is used in a mode that the incident linearly polarized light is incident from the second birefringent layer.

In another variant the present application provides the wavelength plate according to the present invention, wherein the wavelength plate has a conversion efficiency of 80% or higher in a visible light spectrum, where the conversion efficiency is a rate at which linearly polarized light that has been rotated by 90° is emitted from the wavelength plate when the incident linearly polarized light has passed through the wavelength plate twice in a reciprocating manner.

In another variant the present application provides the wavelength plate according to the present invention, wherein the obliquely-deposited birefringent layer is formed over a substrate, and wherein an optical axis of an index ellipsoid approximated by the obliquely-deposited birefringent layer is parallel with the substrate.

In another variant the present application provides the wavelength plate according to the present invention, wherein the substrate has a shape of a rectangle or a square, and wherein the wavelength plate satisfies formulae (5) and (6) below, $$5° \leq \phi1 \leq 30° \tag{5}$$

$$(2\phi1+35°) \leq \phi2 \leq (2\phi1+50°) \tag{6}$$

where φ1 represents an angle formed between a line segment representing the first birefringent layer's optical axis projected on the substrate and one side of the substrate, and φ2 represents an angle formed between a line segment representing the second birefringent layer's optical axis projected on the substrate and one side of the substrate.

In another variant the present application provides the wavelength plate according to the present invention, wherein the substrate has a shape of a rectangle or a square, and wherein the wavelength plate satisfies formulae (12) and (13) below, $$5° \leq \phi2 \leq 30° \tag{12}$$

$$(2\phi2+35°) \leq \phi1 \leq (2\phi2+50°) \tag{13}$$

where φ1 represents an angle formed between a line segment representing the first birefringent layer's optical axis projected on the substrate and one side of the substrate, and φ2 represents an angle formed between a line segment representing the second birefringent layer's optical axis projected on the substrate and one side of the substrate.

In another variant the present application provides the wavelength plate according to the present invention wherein the obliquely-deposited birefringent layer includes a repeated multilayer structure including as constituting units, two kinds of obliquely-deposited films deposited along different deposition directions, and wherein each of the obliquely-deposited films has a thickness of λ/4 or less.

In another variant the present application provides the wavelength plate according to the present invention, wherein the first birefringent layer and the second birefringent layer are made of the same material, and wherein a ratio between the film thickness of the first birefringent layer and the film thickness of the second birefringent layer satisfies a formula (7) below, $$1.7 \leq t1/t2 \leq 2.7. \tag{7}$$

In another variant the present application provides the wavelength plate according to the present invention, wherein the first birefringent layer and the second birefringent layer are made of the same material, and wherein a ratio between the film thickness of the first birefringent layer and the film thickness of the second birefringent layer satisfies a formula (14) below, $$1.5 \leq t2/t1 \leq 2.6. \tag{14}$$

In another variant the present application provides the wavelength plate according to the present invention, wherein the birefringence of the birefringent layers is 0.07 or greater.

In another variant the present application provides the wavelength plate according to the present invention, wherein a constituent material of the obliquely-deposited birefringent layer is an inorganic material containing an oxide of any one of Si, Nb, Zr, Ti, La, Ta, and Al.

In one aspect, the present invention provides an optical device, including:

a light source configured to emit light; and the wavelength plate according to the present invention.

In another variant the present application provides the optical device according to the present invention, wherein the wavelength plate is disposed such that incident linearly polarized light passes through the wavelength plate twice in a reciprocating manner, wherein the incident linearly polarized light passes through the wavelength plate for a first time from the first birefringent layer, and wherein the incident linearly polarized light passes through the wavelength plate for a second time from the second birefringent layer.

In another aspect, the present application provides an optical device, including:

a light source configured to emit light; and the wavelength plate according to the present invention.

In another variant the present application provides the optical device according to the present invention, wherein the wavelength plate is disposed such that incident linearly polarized light passes through the wavelength plate twice in a reciprocating manner, wherein the incident linearly polarized light passes through the wavelength plate for a first time from the second birefringent layer, and wherein the incident linearly polarized light passes through the wavelength plate for a second time from the first birefringent layer.

According to the present invention, it is possible to solve the various conventional problems described above, achieve the object described above, and provide an inorganic wideband quarter wavelength plate having excellent heat resistance, a high conversion efficiency when light has passed through the wavelength plate twice in a reciprocating manner, and a small variation in the degree of retardation depending on the angle of incident light.

DETAILED DESCRIPTION OF THE INVENTION (Wavelength Plate)

A wavelength plate of the present invention is a wideband quarter wavelength plate.

The wavelength plate of the present invention includes at least a first birefringent layer and a second birefringent layer. It is preferable that these birefringent layers be formed over a substrate. The wavelength plate of the present invention further includes other members as needed.

When any matter that the first birefringent layer and the second birefringent layer have in common is to be described, the first birefringent layer and the second birefringent layer may be referred to simply as birefringent layer without being distinguished from each other.

Figure 1A:
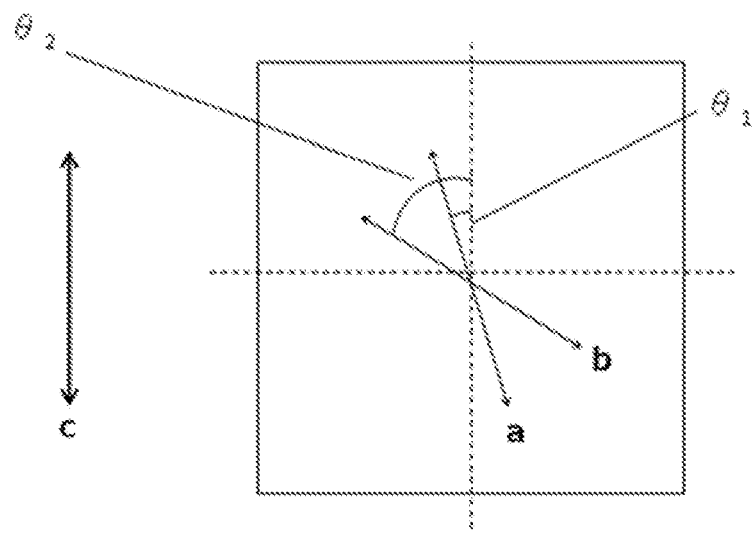
FIG. 1A is a schematic configuration diagram of an example of a wavelength plate of the present invention.
Figure 1B:
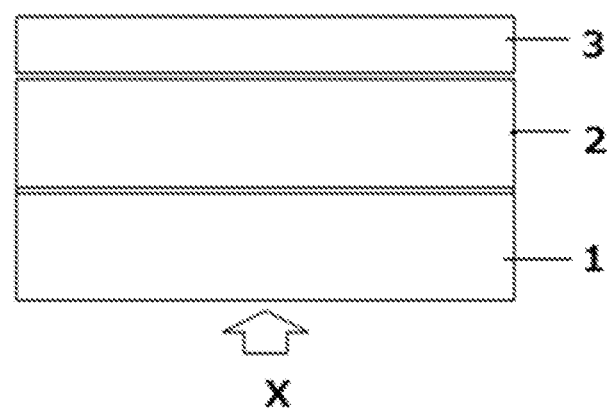
FIG. 1B is a schematic configuration diagram of an example of a wavelength plate of the present invention.

A schematic configuration of an example of the wavelength plate of the present invention is illustrated in FIG. 1A and FIG. 1B;

FIG. 1A is a plan view. FIG. 1B is a cross-sectional view. In FIG. 1A, the reference sign a indicates an optical axis of the first birefringent layer, the reference sign b indicates an optical axis of the second birefringent layer, and the reference sign c indicates the direction of incident linearly polarized light. In FIG. 1B, the reference sign 1 indicates a substrate, the reference sign 2 indicates the first birefringent layer, the reference sign 3 indicates the second birefringent layer, and the reference sign X indicates incident light.

As illustrated in FIG. 1A, an angle formed between a and c and an angle formed between b and c when incident light having the specific polarization direction c is made incident to a surface of the substrate represent an angle $\theta1$ between the optical axis of the first birefringent layer and the incident linearly polarized light and an angle $\theta2$ between the optical axis of the second birefringent layer and the incident linearly polarized light, respectively.

An optical axis refers to a directional axis that makes the refractive index of incident linearly polarized light vibrating in parallel with which the largest or the smallest of the refractive indices of incident linearly polarized light vibrating in parallel with any other directions. In the present invention, when the direction of an optical axis is to be mentioned, the direction that makes the refractive index the largest will be referred to as optical axis.

In the wavelength plate of the present invention, the first birefringent layer and the second birefringent layer are laminated such that the in-plane direction of the optical axis of the first birefringent layer and the in-plane direction of the optical axis of the second birefringent layer cross each other.

In the wavelength plate of the present invention, at least one birefringent layer of the first birefringent layer and the second birefringent layer is formed by oblique deposition.

The wavelength plate of the present invention satisfies either the requirements presented in (A) First embodiment described below or the requirements presented in (B) Second embodiment described below. Note that birefringence of the first birefringent layer is represented as $\Delta n1$, birefringence of the second birefringent layer is represented as $\Delta n2$, a film thickness of the first birefringent layer is represented as $t1$, a film thickness of the second birefringent layer is represented as $t2$, an angle between the optical axis of the first birefringent layer and incident linearly polarized light is represented as $\theta1$, an angle between the optical axis of the second birefringent layer and incident linearly polarized light is represented as $\theta2$, and a predetermined value in the range of wavelengths of incident light is represented as $\lambda$.

(A) First Embodiment

A wavelength plate that satisfies formulae (1), (2), (3), and (4) below.

$$\Delta n1 \times t1 = \lambda/2 \qquad (1)$$

$$1.7 \leq (\Delta n1 \times t1)/(\Delta n2 \times t2) \leq 2.7 \qquad (2)$$

$$5° \leq \theta1 = 30° \qquad (3)$$

$$(2\theta1 + 35°) \leq \theta2 \leq (2\theta1 + 50°) \qquad (4)$$

(B) Second Embodiment

A wavelength plate that satisfies formulae (8), (9), (10), and (11) below.

$$\Delta n1 \times t1 = \lambda/4 \quad (8)$$

$$1.5 \leq (\Delta n2 \times t2)/(\Delta n1 \times t1) \leq 2.6 \quad (9)$$

$$5° \leq \theta2 \leq 30° \quad (10)$$

$$(2\theta2+35°) \leq \theta1 \leq (2\theta2+50°) \quad (11)$$

The wavelength plate of the present invention that satisfies the requirements presented in (A) First embodiment described above or the requirements presented in (B) Second embodiment described above is an inorganic wide-band quarter wavelength plate having excellent heat resistance, a high conversion efficiency, and a small variation in the degree of retardation depending on the angle of incident light.

Here, a conversion efficiency refers to a rate (%) at which linearly polarized light that has been rotated by 90° is emitted from the wavelength plate when the incident linearly polarized light has passed through the wavelength plate twice in a reciprocating manner.

The wavelength plate of the present invention can exhibit the conversion efficiency of 80% or higher in a visible light spectrum.

In the present invention, when any matter that the wavelength plate according to the first embodiment and the wavelength plate according to the second embodiment have in common are to be described or when there is no particular need of distinguishing between the first embodiment and the second embodiment, the term "wavelength plate" may be mentioned to include both of the wavelength plate according to the first embodiment and the wavelength plate according to the second embodiment. Furthermore, also when it is obvious which wavelength plate is mentioned by what is described because it is described in the section [(A) Wavelength plate according to the first embodiment] described below or the section [(B) Wavelength plate according to the second embodiment] described below, the mentioned wavelength plate may be referred to simply as "wavelength plate".

The wavelength plate that satisfies the requirements presented in (A) First embodiment and the wavelength plate that satisfies the requirements presented in (B) Second embodiment will be described in detail separately.

(A) Wavelength Plate According to the First Embodiment

A wavelength plate described below is an example of the first embodiment of the wavelength plate of the present invention.

A wavelength plate, including a first birefringent layer and a second birefringent layer, the first birefringent layer and the second birefringent layer being laminated such that an in-plane direction of an optical axis of the first birefringent layer and an in-plane direction of an optical axis of the second birefringent layer cross each other, wherein the wavelength plate satisfies formulae (1), (2), (3), and (4) below, and wherein at least one birefringent layer of the first birefringent layer and the second birefringent layer is an obliquely-deposited birefringent layer formed by oblique deposition, $$\Delta n1 \times t1 = \lambda/2 \quad (1)$$

$$1.7 \leq (\Delta n1 \times t1)/(\Delta n2 \times t2) \leq 2.7 \quad (2)$$

$$5° \leq \theta1 \leq 30° \quad (3)$$

$$(2\theta1+35°) \leq \theta2 \leq (2\theta1+50°) \quad (4)$$

where $\Delta n1$ represents birefringence of the first birefringent layer, $\Delta n2$ represents birefringence of the second birefringent layer, t1 represents a film thickness of the first birefringent layer, t2 represents a film thickness of the second birefringent layer, $\theta1$ represents an angle between the optical axis of the first birefringent layer and incident linearly polarized light, $\theta2$ represents an angle between the optical axis of the second birefringent layer and incident linearly polarized light, and $\lambda$ represents a predetermined value in a range of wavelengths of incident light.

It is preferable that the wavelength plate according to the first embodiment described above be used in a mode that the incident linearly polarized light is incident from the first birefringent layer.

The meaning of the values specified by the formulae above will be elucidated based on the test examples described below.

Text Example 1

Figure 2:
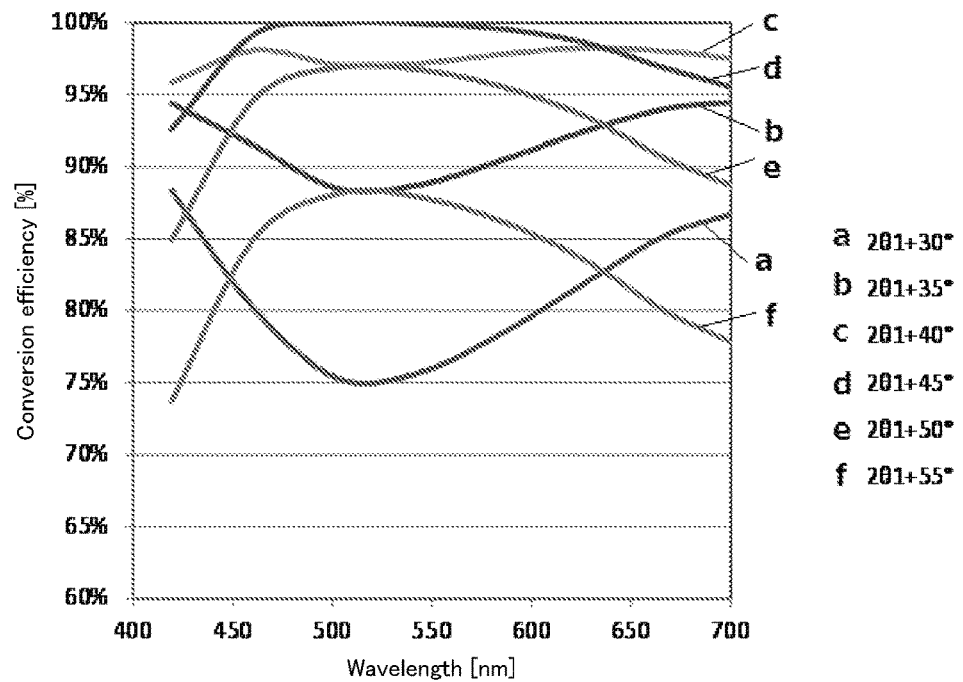
FIG. 2 is a graph plotting wavelength dependency of a conversion efficiency of a wavelength plate according to a first embodiment of the present invention when θ2 is varied from 2θ1+30° through 2θ1+55°.

FIG. 2 plots wavelength dependency of a conversion efficiency of the wavelength plate of the present invention under the conditions that (1) $\Delta n1 \times t1 = \lambda/2$ (where $\lambda=520$ nm), that (2) $(\Delta n1 \times t1)/(\Delta n2 \times t2)=2$, that (3) $\theta1=11.25°$, and that $\theta2$ was varied from $2\theta1+30°$ through $2\theta1+55°$. Incident light was made incident along a direction normal to the substrate.

From the results of FIG. 2, it is known that the conversion efficiency in the visible light spectrum was higher than 80% in a $\theta2$ range of from $2\theta1+35°$ through $2\theta1+50°$, which means that the wavelength plate functioned as a wide-band wavelength plate.

Incidentally, a conversion efficiency, in the visible light spectrum, of a quartz-crystal wavelength plate, which is a typical inorganic wavelength plate, is 80% or higher. It is therefore known that the wavelength plate of the present invention has a performance equal to or higher than that of the quartz-crystal wavelength plate when light is incident along the direction normal to the substrate.

Text Example 2

Figure 3:
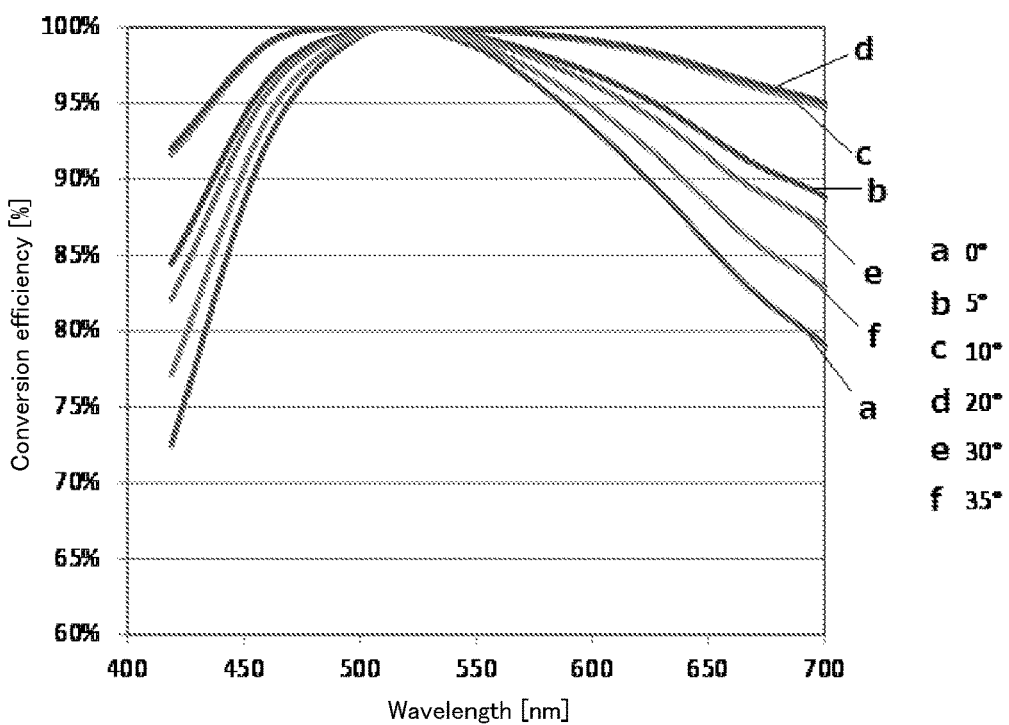
FIG. 3 is a graph plotting wavelength dependency of a conversion efficiency of a wavelength plate according to a first embodiment of the present invention when θ1 is varied from 0° through 35°.

FIG. 3 plots wavelength dependency of a conversion efficiency of the wavelength plate of the present invention under the conditions that (1) $\Delta n1 \times t1 = \lambda/2$ (where $\lambda=520$ nm), that (2) $(\Delta n1 \times t1)/(\Delta n2 \times t2)=2$, that (4) $\theta2=2\theta1+45°$, and that $\theta1$ was varied from 0° through 35°.

From the results of FIG. 3, it is known that the conversion efficiency in the visible light spectrum was higher than 80% in a $\theta1$ range of from 5° through 30°, which means that the wavelength plate functioned as a wide-band wavelength plate.

Text Example 3

A relationship between $\lambda$ and a conversion efficiency will be described.

Figure 4:
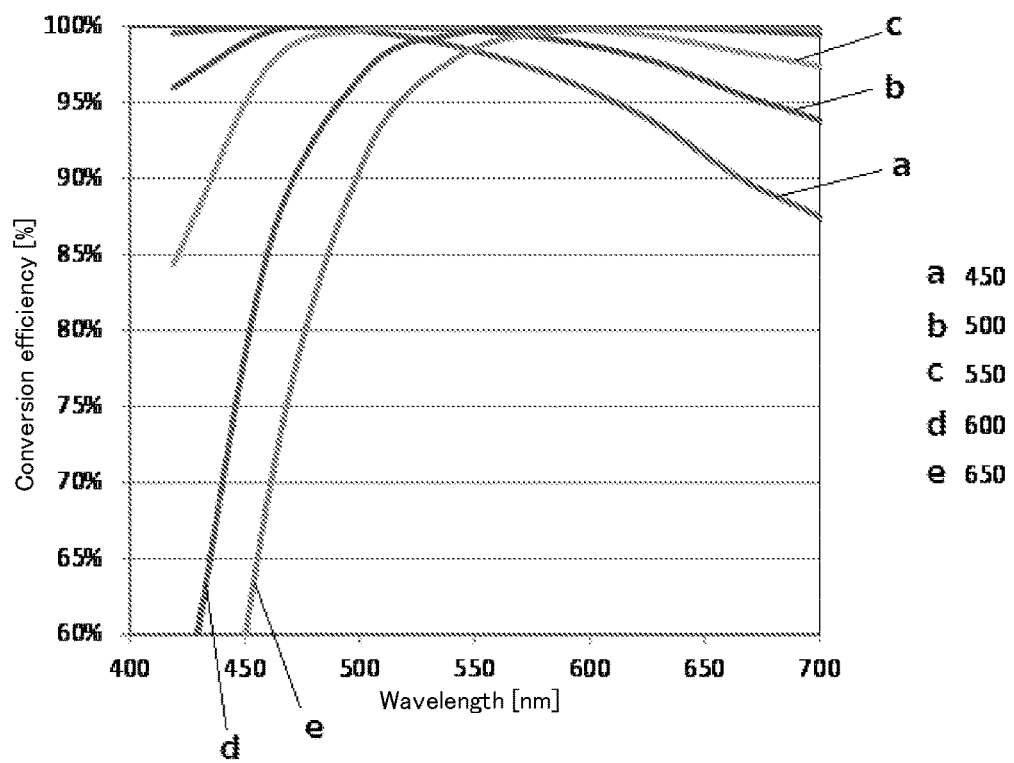
FIG. 4 is a graph plotting wavelength dependency of a conversion efficiency of a wavelength plate according to a first embodiment of the present invention when λ (nm) is set to 450, to 500, to 550, to 600, and to 650.

FIG. 4 plots wavelength dependency of a conversion efficiency of the wavelength plate of the present invention under the conditions that (1) $\Delta n1 \times t1 = \lambda/2$, that (2) $(\Delta n1 \times t1)/$ ($\Delta n2 \times t2$)=2, that (3) $\theta1=11.25°$, that (4) $\theta2=2\theta1+45°$, and that $\lambda$ (nm) was set to 450, to 500, to 550, to 600, and to 650.

From the results of FIG. 4, it is preferable to design t1 and t2 based on a condition that $\lambda$ is from 500 nm through 600 nm, in order to obtain a favorable conversion efficiency throughout the visible light spectrum (from 450 nm through 650 nm).

For example, in order to obtain a birefringent layer having $\Delta n1=0.13$ under the condition that $\lambda=520$ nm, t1 may be set to 2,000 nm. For example, when it is desired to more effectively convert a spectral range of from blue through green (from 430 nm through 580 nm) and a spectral range of from green through red (from 520 nm through 680 nm), t1 and t2 may be designed based on an optimum value of $\lambda$.

The specific configuration of the wavelength plate of the present invention will be described further below.

Substrate

The substrate is not particularly limited, and an arbitrary substrate may be selected according to the purpose so long as the substrate is a transparent substrate having transmissivity to light in a spectrum used.

The material of the transparent substrate is not particularly limited, and may be appropriately selected according to the purpose. Examples of the material include glass, quartz, and quartz crystal.

The shape of the substrate is not particularly limited, and may be appropriately selected according to the purpose. However, a rectangular shape or a square shape is preferable.

The average thickness of the substrate is not particularly limited, and may be appropriately selected according to the purpose. However, the average thickness is preferably from 0.1 mm through 3.0 mm, and more preferably from 0.1 mm through 2.0 mm in order to prevent warpage and deformation of the substrate.

Minute patterns may be formed over the surface of the transparent substrate. With the minute patterns, the birefringent layers, when formed by oblique deposition, will have an additional effect of a structural birefringence and hence an increased birefringence.

First Birefringent Layer and Second Birefringent Layer

In the present invention, a birefringent layer refers to a layer having a birefringent function. The wavelength plate of the present invention includes at least a first birefringent layer and a second birefringent layer. These birefringent layers are laminated one over another.

At least one birefringent layer of the first birefringent layer and the second birefringent layer is formed by oblique deposition. In the present invention, the birefringent layer formed by oblique deposition is referred to as obliquely-deposited birefringent layer.

In the present invention, it is more preferable to form both of the first birefringent layer and the second birefringent layer by oblique deposition.

It is preferable that the obliquely-deposited birefringent layer be constituted by a repeated multilayer structure that includes as constituting units, two kinds of obliquely-deposited films deposited along different deposition directions.

The average thickness of each obliquely-deposited film is preferably $\lambda/4$ or less, and more preferably $\lambda/10$ or less.

Figure 5A:
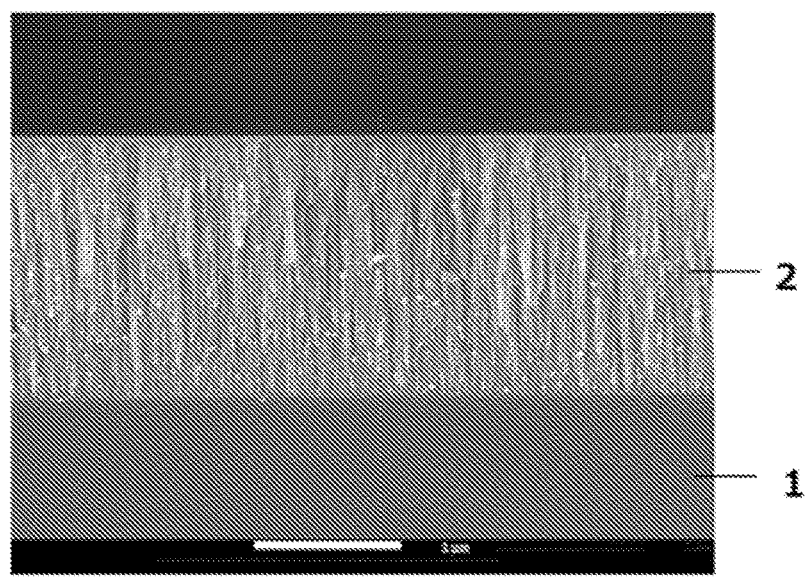
FIG. 5A is a diagram illustrating an example of a scanning electron microscope image (SEM image) of a cross-section of a first birefringent layer.
Figure 5B:
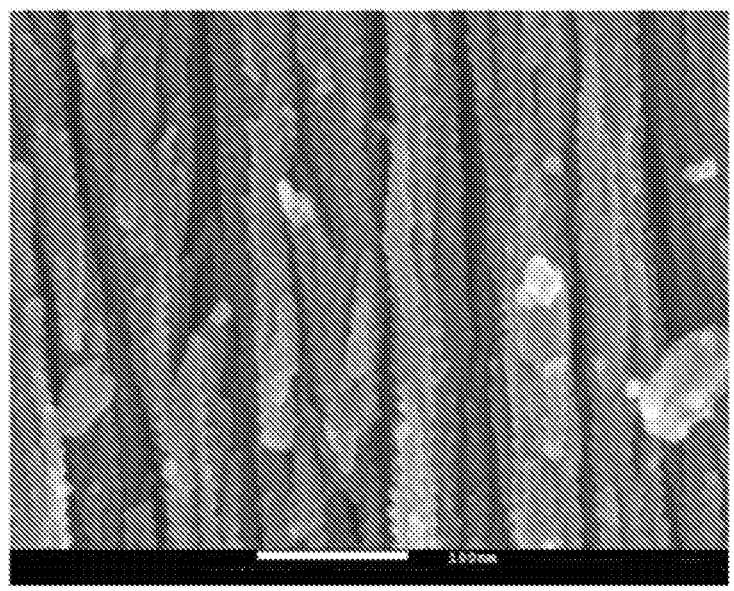
FIG. 5B is an enlarged diagram of FIG. 5A.
Figure 5C:
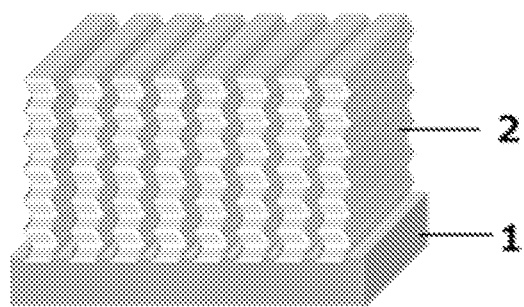
FIG. 5C is an exemplary diagram illustrating an example of a first birefringent layer.
Figure 6:
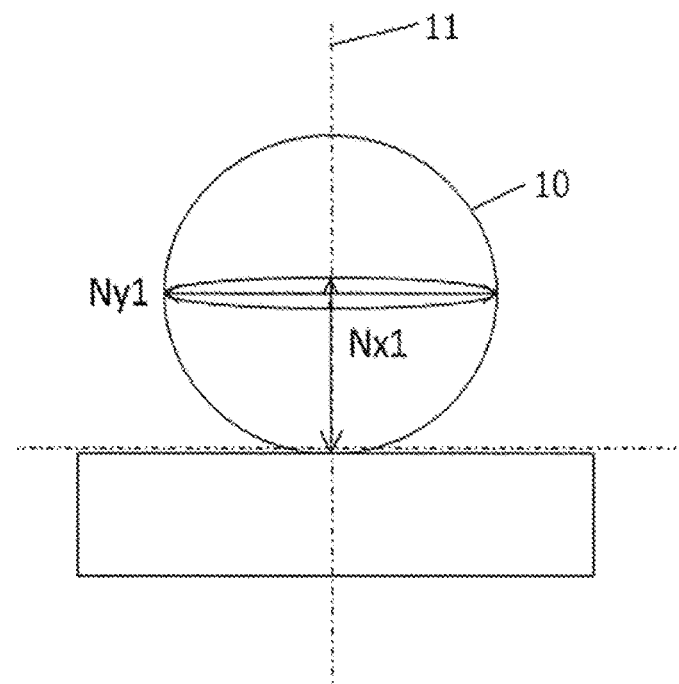
FIG. 6 is a schematic diagram of an index ellipsoid approximated by a birefringent layer.

To describe the obliquely-deposited birefringent layer, FIG. 5A, FIG. 5B, and FIG. 5C give scanning electron microscope images (SEM image) and an exemplary diagram illustrating an example of the first birefringent layer formed over a substrate. FIG. 6 illustrates a schematic diagram of an index ellipsoid approximated by the obliquely-deposited birefringent layer.

FIG. 5A is a SEM image illustrating a cross-section of the first obliquely-deposited birefringent layer. FIG. 5B is an enlarged view of FIG. 5A. In FIG. 5A and FIG. 5C, the reference sign 1 indicates the substrate, and the reference sign 2 indicates the first birefringent layer. As illustrated in FIG. 5C, the obliquely-deposited birefringent layer is formed by laminating a plurality of obliquely-deposited films.

In FIG. 6, the reference sign 10 indicates an index ellipsoid approximated by the obliquely-deposited birefringent layer, and the reference sign 11 indicates a normal to the substrate. In FIG. 6, Nx1 denotes an axis of refractive index Nx in the x-direction and Ny1 denotes an axis of refractive index Ny in the y-direction.

Due to a so-called self-shadowing effect, the obliquely-deposited layer formed by oblique deposition has a relatively higher deposited-particle density in a substrate's in-plane direction perpendicular to the direction along which deposited particles have been incident (the perpendicular in-plane direction being referred to as x-direction), and a relatively lower deposited-particle density in a substrate's in-plane direction parallel with the direction along which deposited particles have been incident (the parallel in-plane direction being referred to as y-direction). When light becomes incident to this deposited film along a direction perpendicular to the substrate, birefringence occurs due to a refractive index difference attributed to the coarse or dense density difference of the film. A relationship below is established between the refractive index in the x-direction, referred to as Nx, and the refractive index in the y-direction, referred to as Ny.

$$Nx > Ny$$

Here, in-plane retardation through the substrate is referred to as R0. The in-plane retardation R0 is represented by a formula below.

$$R0 = (Nx - Ny) \times t$$

Here, Nx–Ny is typically referred to as birefringence $\Delta n$. Birefringence $\Delta n$ is determined by the refractive index of the material to be deposited, deposition conditions, etc.

The in-plane retardation R0 is a product between the birefringence $\Delta n$ and the thickness t of the deposited film. Hence, it is possible to control retardation of a deposited film based on the film thickness, so long as the deposited film has a relatively large birefringence $\Delta n$. In the present invention, it is possible to set the in-plane retardation R0 in a range of 0 nm<R0<1,000 nm by controlling the deposited film thickness. This enables the wavelength plate to be used also as a quarter wavelength plate.

In the wavelength plate of the present invention, it is preferable that the birefringence of the birefringent layers be 0.07 or greater. With the birefringence of 0.07 or greater, the film thickness required to generate a retardation of $\lambda/2$ is 4 $\mu$m even when $\lambda=550$ nm, which makes it possible to control thickening of the film thickness. Any greater film thickness may lead to risks of a low transmittance and a poor angle dependency.

The birefringence $\Delta n$ of the birefringent layers can be obtained by measuring a retardation (Re) with a retardation measuring instrument (e.g., RETS-100 available from Otsuka Electronics Co., Ltd.) and dividing the Re value by the film thickness of the birefringent layers.

The film thickness t of the birefringent layers can be measured by, for example, observing a cross-section of the birefringent layers with a scanning electron microscope (SEM). The average thickness can be obtained by measuring the film thickness from ten positions and arithmetically averaging the measurements.

It is preferable that the optical axis of an index ellipsoid approximated by the birefringent layers of the wavelength plate of the present invention be parallel with the substrate as illustrated in FIG. 6. When the birefringent layers are formed according to an oblique deposition method described below as a repeated multilayer structure that includes two kinds of obliquely-deposited films as constituting units, the optical axes of the birefringent layers can be adjusted to directions parallel with the substrate. A wavelength plate according to this embodiment can be used favorably in optical devices such as an optical isolator optical system described below.

When a substrate having a rectangular shape or a square shape is used as the substrate, it is preferable that the wavelength plate satisfy formulae (5) and (6) below.

$$5° \leq \phi1 \leq 30° \quad (5)$$

$$(2\phi1+35°) \leq \phi2 \leq (2\phi1+50°) \quad (6)$$

where $\phi1$ represents an angle formed between a line segment representing the first birefringent layer's optical axis projected on the substrate and one side of the substrate, and $\phi2$ represents an angle formed between a line segment representing the second birefringent layer's optical axis projected on the substrate and one side of the substrate.

The wavelength plate according to this embodiment can be mounted on optical devices such as an optical isolator optical system described below in a manner easy for linearly polarized light to be matched with the optical axes of the birefringent layers.

Materials of Birefringent Layers

The constituent materials of the obliquely-deposited birefringent layers formed by oblique deposition are not particularly limited, and arbitrary materials may be selected according to the purpose. However, inorganic materials containing an oxide of any one of Si, Nb, Zr, Ti, La, Ta, and Al are preferable.

The constituent materials of the obliquely-deposited birefringent layers may be the same or different. The constituent materials are not particularly limited, and arbitrary materials may be selected according to the purpose. However, it is preferable that the obliquely-deposited birefringent layers be made of the same material because this enables continuous formation of the layers by deposition, leading to cost saving.

Results of measurement of various optical properties of the wavelength plate of the present invention when $Ta_2O_5$ is used as a main component of the material of the obliquely-deposited birefringent layers and when $ZrO_2$ is used as a main component thereof are presented below.

Test Example 4

Figure 7:
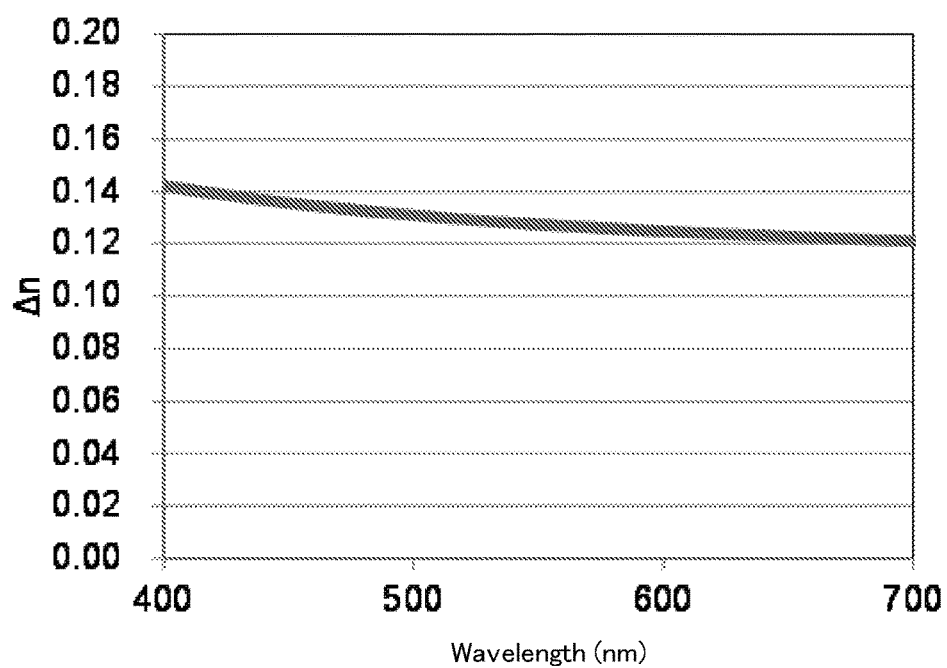
FIG. 7 is a graph plotting wavelength dependency of Δn in a multilayer structure made of $Ta_2O_5$-deposited films.

FIG. 7 plots wavelength dependency of $\Delta n$ when a repeated multilayer structure including 7 nm deposited films as constituting units was formed with a material containing $Ta_2O_5$ as a main component. As plotted in FIG. 7, for example, $\Delta n=0.13$ was obtained when $\lambda=520$ nm.

Figure 8A:
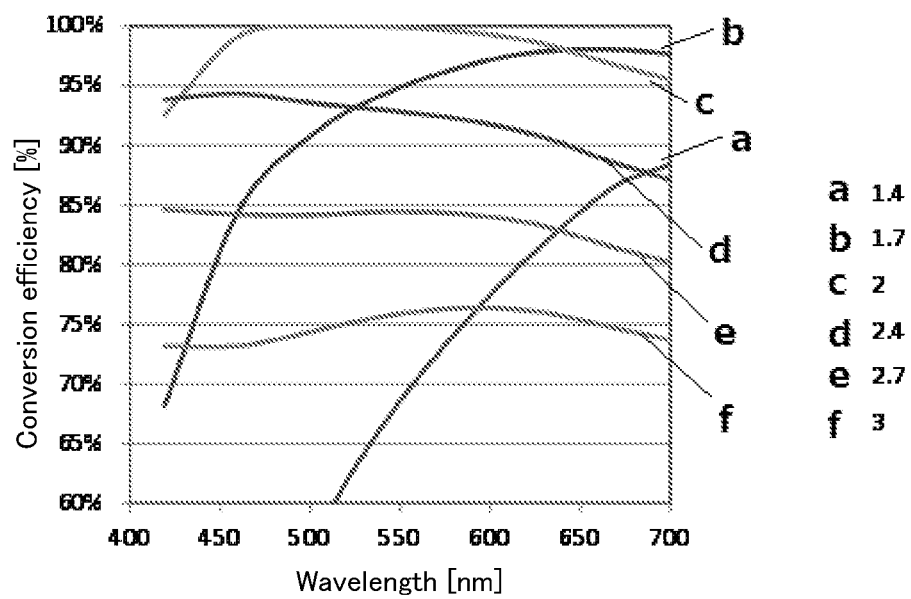
FIG. 8A is a graph plotting wavelength dependency of a conversion efficiency of a wavelength plate according to a first embodiment of the present invention made of a $Ta_2O_5$ material based on a ratio between t1 and t2.
Figure 8B:
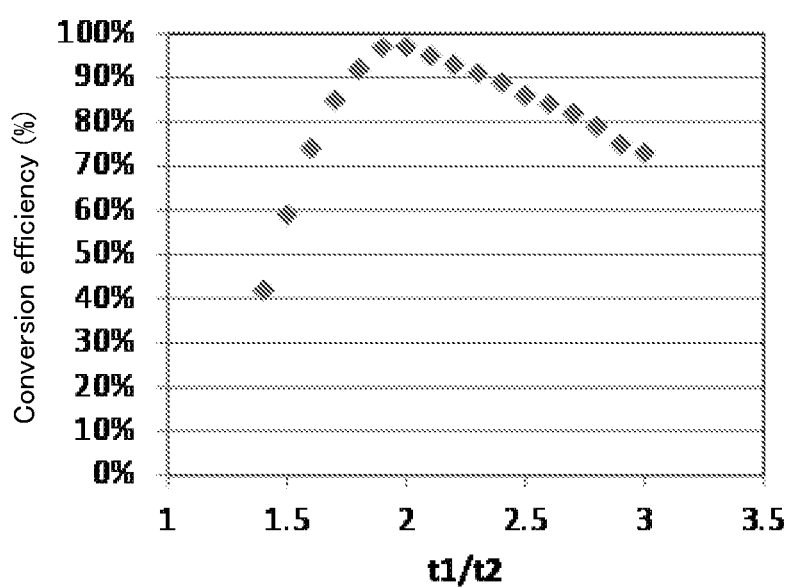
FIG. 8B is a graph plotting minimum values of a conversion efficiency, in a visible light spectrum (from 450 nm through 650 nm), of a wavelength plate according to a first embodiment of the present invention made of a $Ta_2O_5$ material relative to a ratio between t1 and t2.

FIG. 8A and FIG. 8B plot changes of the conversion efficiency of the wavelength plate of the present invention based on a ratio between t1 and t2, when the first birefringent layer and the second birefringent layer were made of $Ta_2O_5$ and t1 was designed based on $\lambda=520$ nm. Here, $\theta1$ was set to 11.25°, and $\theta2$ was set to 67.5°. FIG. 8A plots wavelength dependency of the conversion efficiency. FIG. 8B plots minimum values of the conversion efficiency in a visible light spectrum (from 450 nm through 650 nm). From FIG. 8B, it is known that the conversion efficiency in the visible light spectrum (from 450 nm through 650 nm) was 80% or higher in a range of $1.7 \leq t1/t2 \leq 2.7$, which means that the wavelength plate was a favorable wide-band wavelength plate functioning in that wavelength spectrum.

Test Example 5

Figure 9A:
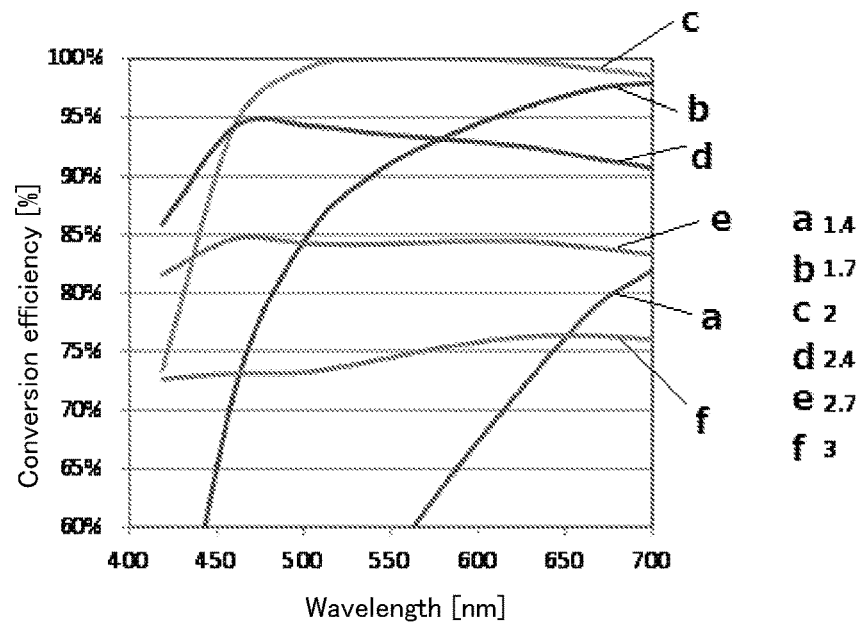
FIG. 9A is a graph plotting wavelength dependency of a conversion efficiency based a ratio between t1 and t2 in a case where λ values in FIG. 8A are changed.
Figure 9B:
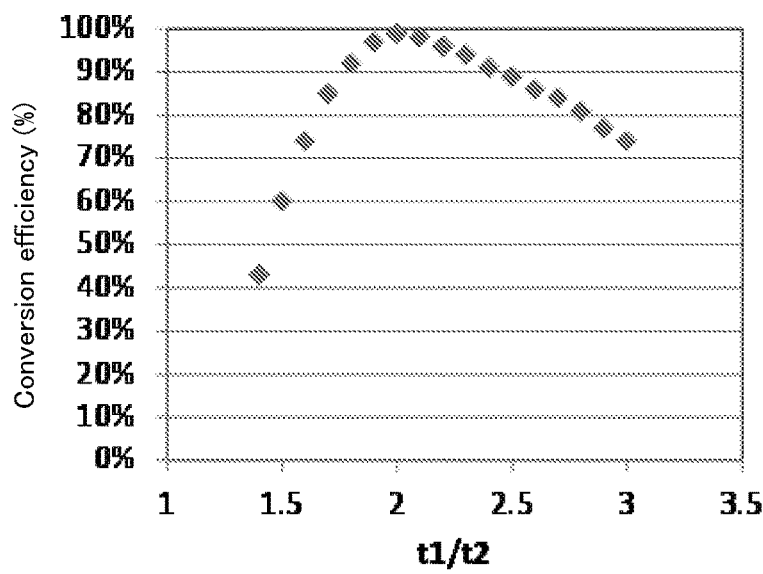
FIG. 9B is a graph plotting minimum values of a conversion efficiency in a spectral range of from green through red (from 520 nm through 670 nm) relative to a ratio between t1 and t2 in a case where λ values in FIG. 8A are changed.

FIG. 9A and FIG. 9B plot changes of the conversion efficiency of the wavelength plate of the present invention based on a ratio between t1 and t2, when the first birefringent layer and the second birefringent layer were made of $Ta_2O_5$ and t1 was designed based on $\lambda=585$ nm. Here, $\theta1$ was set to 11.25°, and $\theta2$ was set to 67.5°. FIG. 9A plots wavelength dependency of the conversion efficiency. FIG. 9B plots minimum values of the conversion efficiency in a spectral range of from green through red (from 520 nm through 670 nm). From FIG. 9B, it is known that the conversion efficiency in the spectral range of from green through red (from 520 nm through 670 nm) was 80% or higher in a range of $1.7 \leq t1/t2 \leq 2.7$, which means that the wavelength plate was a favorable wide-band wavelength plate functioning in that wavelength spectrum.

As presented in Test Examples 4 and 5, a wide-band wavelength plate can be obtained for a desired wavelength spectrum so long as at least t1/t2 is in the range of $1.7 \leq t1/t2 \leq 2.7$.

Text Example 6

Results of the conversion efficiency when the first birefringent layer and the second birefringent layer were made of different materials are presented below.

Figure 10:
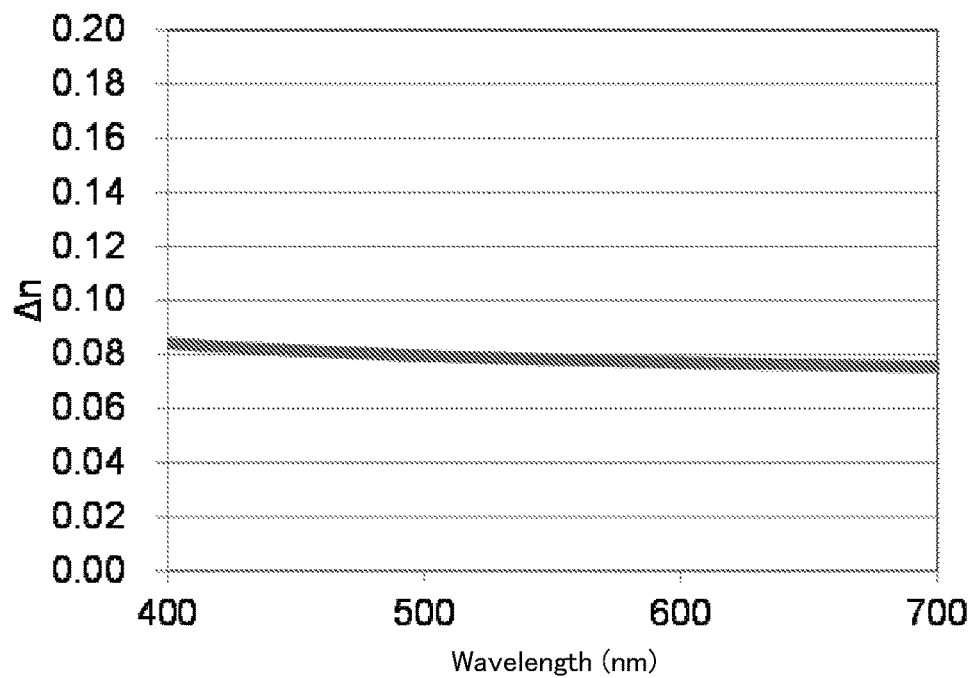
FIG. 10 is a graph plotting wavelength dependency of Δn in a multilayer structure made of $ZrO_2$-deposited films.

FIG. 10 plots wavelength dependency of $\Delta n$ when a repeated multilayer structure including 7 nm deposited films as constituting units was formed with a material containing $ZrO_2$ as a main component. As plotted in FIG. 10, for example, $\Delta n=0.08$ was obtained when $\lambda=520$ nm.

The first birefringent layer was made of the above-described material containing $Ta_2O_5$ as a main component, and the second birefringent layer was made of a material containing $ZrO_2$ as a main component.

Figure 11A:
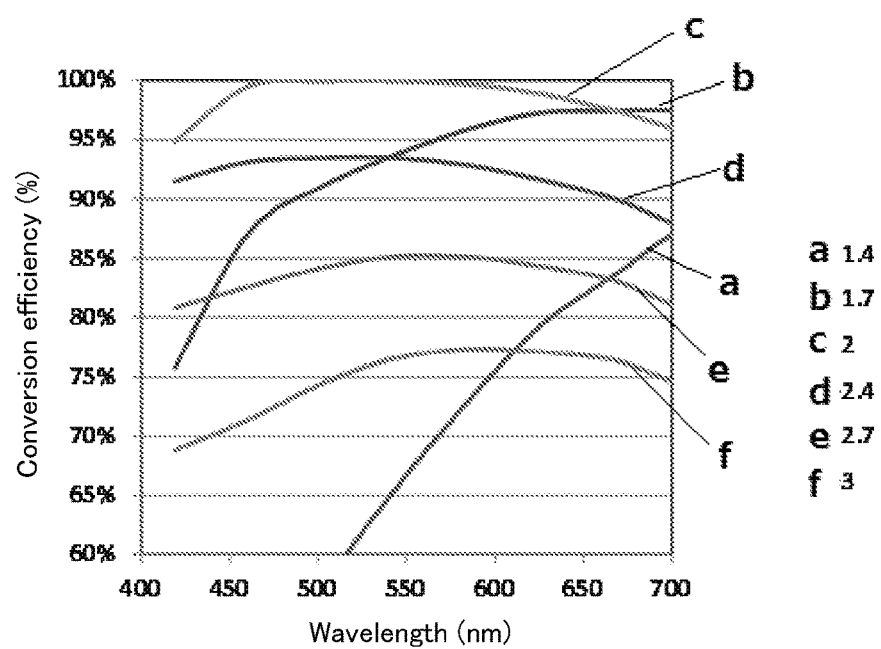
FIG. 11A is a graph plotting wavelength dependency of a conversion efficiency of a wavelength plate according to a first embodiment of the present invention in which a first birefringent layer is made of a $Ta_2O_5$ material and a second birefringent layer is made of a $ZrO_2$ material based on a ratio between (Δn1×t1) and (Δn2×t2)
Figure 11B:
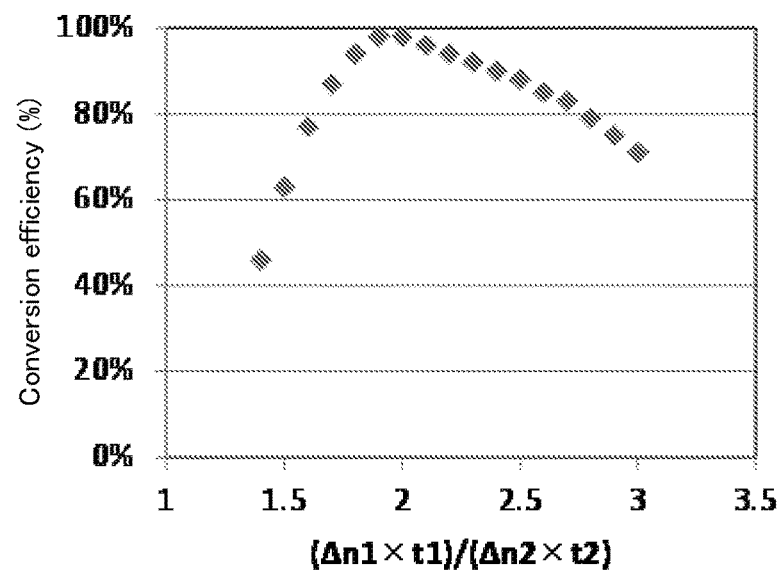
FIG. 11B is a graph plotting minimum values of a conversion efficiency, in a visible light spectrum (from 450 nm through 650 nm), of a wavelength plate according to a first embodiment of the present invention in which a first birefringent layer is made of a $Ta_2O_5$ material and a second birefringent layer is made of a $ZrO_2$ material relative to a ratio between (Δn1×t1) and (Δn2×t2)

FIG. 11A and FIG. 11B plot changes of the conversion efficiency of the wavelength plate of the present invention based on a ratio between ($\Delta n1 \times t1$) and ($\Delta n2 \times t2$) when t1 was designed based on $\lambda=520$ nm. Here, $\theta1$ was set to 11.25°, and $\theta2$ was set to 67.5°. FIG. 11A plots wavelength dependency of the conversion efficiency. FIG. 11B plots minimum values of the conversion efficiency in a visible light spectrum (from 450 nm through 650 nm). From FIG. 11B, it is known that the conversion efficiency in a spectral range of from green through red (from 520 nm through 670 nm) was 80% or higher in a range of $1.7 \leq (\Delta n1 \times t1)/(\Delta n2 \times t2) \leq 2.7$, which means that the wavelength plate was a favorable wide-band wavelength plate functioning in that wavelength spectrum.

Hence, a wide-band wavelength plate can be obtained for a desired wavelength spectrum so long as at least $(\Delta n1 \times t1)/(\Delta n2 \times t2)$ is in the range of $1.7 \leq (\Delta n1 \times t1)/(\Delta n2 \times t2) \leq 2.7$.

Other Layers

The wavelength plate of the present invention may further include an antireflection layer and a protective layer.

The antireflection layer is not particularly limited, and an arbitrary antireflection layer may be selected according to the purpose so long as the antireflection layer is a layer that can prevent reflection by means of a refractive index difference and reduce reflectance of incident light. The antireflection layer is provided over a top surface of the first and second birefringent layers provided, and over a surface of the substrate opposite to the surface over which the first and second birefringent layers are provided. As needed, the antireflection layer may be provided between the substrate and the first birefringent layer and between the first birefringent layer and the second birefringent layer in order to prevent reflection on the interface between the films. The position where the antireflection layer is provided is appropriately selected according to the purpose.

The protective layer is not particularly limited, and an arbitrary protective layer may be selected according to the purpose so long as the protective layer is a layer that can improve humidity resistance.

The antireflection layer and the protective layer can be formed by sputtering and normal deposition.

Other Embodiments of the Wavelength Plate of the Present Invention

In a preferable embodiment of the present invention, both of the first birefringent layer and the second birefringent layer are formed by oblique deposition. However, one of the first birefringent layer and the second birefringent layer may be formed by oblique deposition, and the other of the layers may be formed of a layer made of a single crystal such as quartz crystal.

For example, the wavelength plate of the present invention may be formed as a configuration in which the first birefringent layer is an inorganic single-crystal wavelength plate made of quartz crystal and the above-described birefringent layer formed by oblique deposition is the second birefringent layer.

Producing Method

The birefringent layers can be formed by, for example, oblique deposition.

In oblique deposition, particles of a high-refractive-index material are made incident to a transparent substrate along an oblique direction. As the high-refractive-index material, oxides such as $Ta_2O_5$, $TiO_2$, $SiO_2$, $Al_2O_3$, $La_2O_3$, $ZrO_2$, $ZrO$, and $Nb_2O_5$, or any combinations of these may be used. It is preferable to use a material containing $Ta_2O_5$ as a main component.

Figure 12:
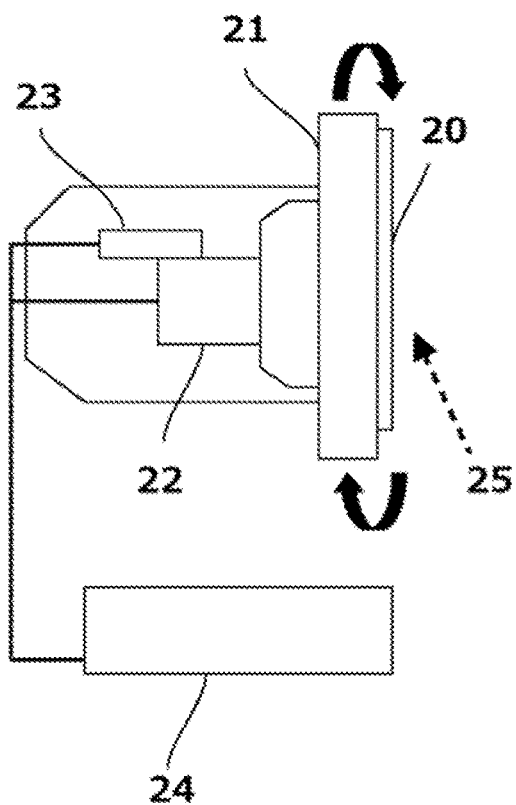
FIG. 12 is a schematic diagram illustrating an example of a deposition apparatus.

FIG. 12 is a schematic diagram illustrating an example of a deposition apparatus.

This deposition apparatus includes a substrate stage 21 configured to hold a substrate 20, a stepping motor 22 configured to rotate the substrate stage 21, a sensor 23 configured to detect a rotational position, and a controller 24 configured to control the stepping motor 22 based on the rotational position. In FIG. 12, the reference sign 25 indicates a deposition direction. This deposition apparatus includes one deposition source, and is capable of laminating a very thin deposited film by rotating the substrate stage 21 by 180° for each layer.

A method for producing the wavelength plate of the present invention will be specifically described below.

A very thin deposited film for the first layer is formed over the substrate by oblique deposition. Next, a deposited film for the second layer is formed by deposition performed from an angular position of deposition that is opposite by 180° in the in-plane direction of the substrate. Here, the first layer and the second layer are formed to have the same film thickness. Each deposited film is formed to have a thickness sufficiently smaller than the wavelength of light to be used for a wavelength plate. For example, the thickness is preferably $\lambda/4$ or less, and more preferably $\lambda/10$ or less as described above. This process is repeated up to the n-th layer to perform deposition up to a film thickness with which a required retardation can be obtained, to thereby form a multilayer structure having a desired retardation. This is the first birefringent layer.

FIG. 5A and FIG. 5B are SEM images of the first birefringent layer obtained according to the method described above. FIG. 6 illustrates a schematic diagram of an index ellipsoid approximated by the first birefringent layer. The first birefringent layer has optical axes in a direction parallel with the in-plane direction of the substrate and in a direction perpendicular to the in-plane direction of the substrate The birefringent layer formed by oblique deposition is constituted by a repeated multilayer structure that includes as constituting units, two kinds of obliquely-deposited films deposited along different deposition directions. Therefore, the optical axis of an index ellipsoid approximated by the birefringent layer having this structure can be easily adjusted to a direction parallel with the substrate.

Next, a very thin deposited film for the (n+1)-th layer is formed over the first birefringent layer by oblique deposition. Further, a deposited film for the (n+2)-th layer is formed by deposition performed from an angular position of deposition that is opposite by 180° in the in-plane direction of the substrate. Here, the (n+1)-th layer and the (n+2)-th layer are formed to have the same film thickness. Each deposited film is formed to have a thickness sufficiently smaller than the wavelength of light to be used for a wavelength plate. For example, the thickness is preferably $\lambda/4$ or less, and more preferably $\lambda/10$ or less as described above. This process is repeated to perform deposition up to a film thickness with which a required retardation can be obtained, to thereby form a multilayer structure having a desired retardation. This is the second birefringent layer.

For example, in the above-described formation of the first birefringent layer and the second birefringent layer, the deposition direction along which formation of the first birefringent layer is performed is set such that an angle $\theta 1$ between a line segment representing the deposition direction projected on the substrate in plane and incident linearly polarized light is from 5° through 30°, and the deposition direction along which formation of the second birefringent layer is performed is set such that an angle $\theta 2$ between a line segment representing the deposition direction projected on the substrate in plane and incident linearly polarized light is from $2\theta 1+35°$ through $2\theta 1+50°$.

When formation of the first birefringent layer and the second birefringent layer is performed by setting the deposition directions as described above, the first birefringent layer and the second birefringent layer satisfying the formulae (3) and (4) described above can be formed.

After the oblique deposition, it is preferable to perform decolorization and an anneal treatment for evaporating a water content adsorbed between pillared tissues. If a water content is adsorbed between pillared tissues, the refractive index of the deposited film changes, which may significantly change the properties of the deposited film. Hence, it is preferable to perform the anneal treatment at 100° C. or higher at which a water content evaporates. If the temperature is too high, pillared tissues may grow together to a columnar shape, which may reduce birefringence and transmittance. Therefore, a temperature of 300° C. or lower is preferable.

(B) Wavelength Plate According to the Second Embodiment

Next, a wavelength plate according to the second embodiment will be described. In the following, differences from the wavelength plate according to the first embodiment described above will be mainly described.

A wavelength plate described below is an example of the wavelength plate according to the second embodiment of the present invention.

A wavelength plate, including a first birefringent layer and a second birefringent layer, the first birefringent layer and the second birefringent layer being laminated such that an in-plane direction of an optical axis of the first birefringent layer and an in-plane direction of an optical axis of the second birefringent layer cross each other, wherein the wavelength plate satisfies formulae (8), (9), (10), and (11) below, and wherein at least one birefringent layer of the first birefringent layer and the second birefringent layer is an obliquely-deposited birefringent layer formed by oblique deposition, $$\Delta n1 \times t1 = \lambda/4 \tag{8}$$

$$1.5 \leq (\Delta n2 \times t2)/(\Delta n1 \times t1) \leq 2.6 \tag{9}$$

$$5° \leq \theta2 \leq 30° \tag{10}$$

$$(2\theta2+35°) \leq \theta1 \leq (2\theta2+50°) \tag{11}$$

where $\Delta n1$ represents birefringence of the first birefringent layer, $\Delta n2$ represents birefringence of the second birefringent layer, $t1$ represents a film thickness of the first birefringent layer, $t2$ represents a film thickness of the second birefringent layer, $\theta1$ represents an angle between the optical axis of the first birefringent layer and incident linearly polarized light, $\theta2$ represents an angle between the optical axis of the second birefringent layer and incident linearly polarized light, and $\lambda$ represents a predetermined value in a range of wavelengths of incident light.

It is preferable that the wavelength plate according to the second embodiment described above be used in a mode that the incident linearly polarized light is incident from the second birefringent layer.

The meaning of the values specified by the formulae above will be elucidated based on the test examples described below.

Text Example 7

Figure 13:
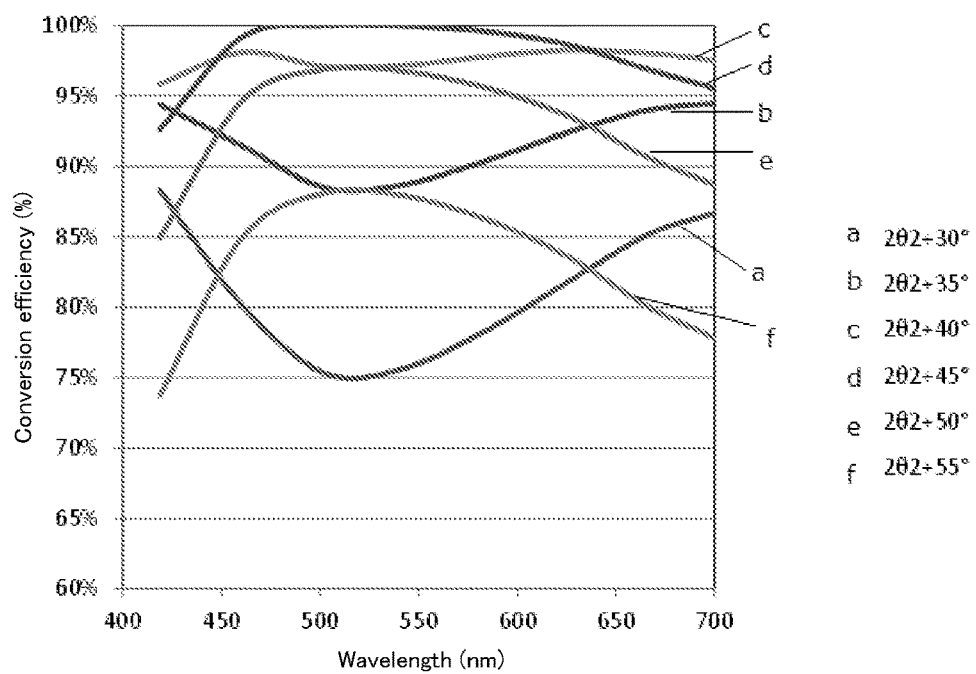
FIG. 13 is a graph plotting wavelength dependency of a conversion efficiency of a wavelength plate according to a second embodiment of the present invention when θ1 is varied from 2θ2+30° through 2θ2+55°.

FIG. 13 plots wavelength dependency of a conversion efficiency of the wavelength plate of the present invention under the conditions that (8) $\Delta n1 \times t1 = \lambda/4$ (where $\lambda = 520$ nm), that (9) $(\Delta n2 \times t2)/(\Delta n1 \times t1) = 2$, that (10) $\theta2 = 11.25°$, and that $\theta1$ was varied from $2\theta2+30°$ through $2\theta2+55°$. Incident light was made incident along a direction normal to the substrate.

From the results of FIG. 13, it is known that the conversion efficiency in the visible light spectrum was higher than 80% in a $\theta1$ range of from $2\theta2+35°$ through $2\theta2+50°$, which means that the wavelength plate functioned as a wide-band wavelength plate.

Incidentally, a conversion efficiency, in the visible light spectrum, of a quartz-crystal wavelength plate, which is a typical inorganic wavelength plate, is 80% or higher. It is therefore known that the wavelength plate of the present invention has a performance equal to or higher than that of the quartz-crystal wavelength plate when light is incident along the direction normal to the substrate.

Text Example 8

Figure 14:
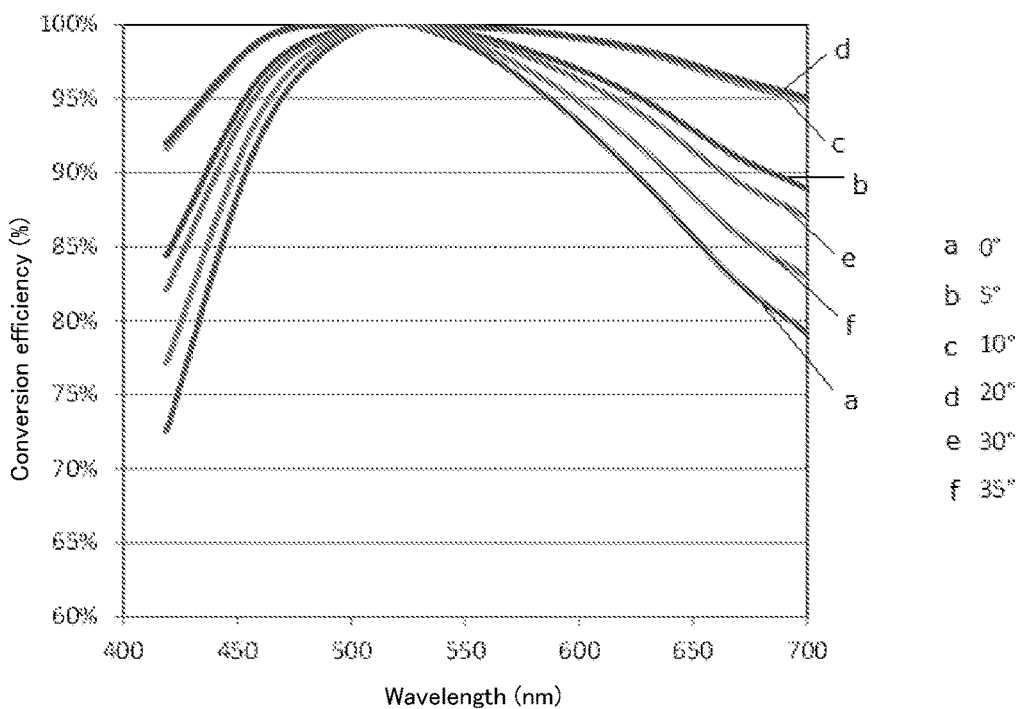
FIG. 14 is a graph plotting wavelength dependency of a conversion efficiency of a wavelength plate according to a second embodiment of the present invention when θ2 is varied from 0° through 35°.

FIG. 14 plots wavelength dependency of a conversion efficiency of the wavelength plate of the present invention under the conditions that (8) $\Delta n1 \times t1 = \lambda/4$ (where $\lambda = 520$ nm), that (9) $(\Delta n2 \times t2)/(\Delta n1 \times t1) = 2$, that (11) $\theta1 = 2\theta2+45°$, and that $\theta2$ was varied from 0° through 35°.

From the results of FIG. 14, it is known that the conversion efficiency in the visible light spectrum was higher than 80% in a $\theta2$ range of from 5° through 30°, which means that the wavelength plate functioned as a wide-band wavelength plate.

Text Example 9

A relationship between $\lambda$ and a conversion efficiency will be described.

Figure 15:
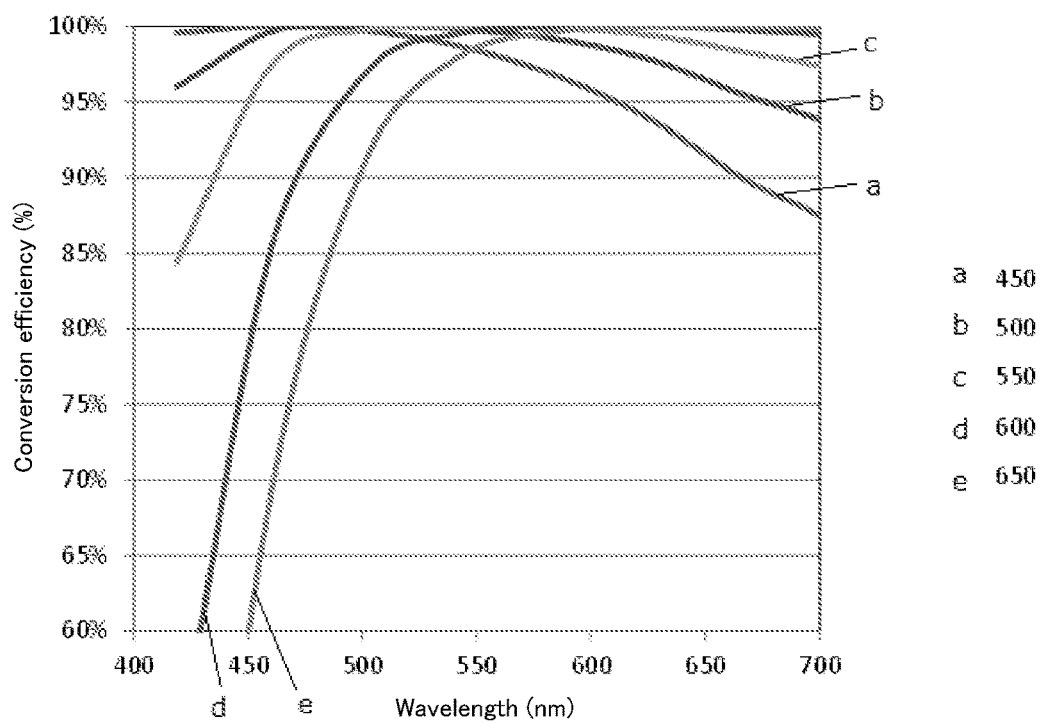
FIG. 15 is a graph plotting wavelength dependency of a conversion efficiency of a wavelength plate according to a second embodiment of the present invention when λ (nm) is set to 450, to 500, to 550, to 600, and to 650.

FIG. 15 plots wavelength dependency of a conversion efficiency of the wavelength plate of the present invention under the conditions that (8) $\Delta n1 \times t1 = \lambda/4$, that (9) $(\Delta n2 \times t2)/(\Delta n1 \times t1) = 2$, that (10) $\theta2 = 11.25°$, that (11) $\theta1 = 2\theta2+45°$, and that $\lambda$ (nm) was set to 450, to 500, to 550, to 600, and to 650.

From the results of FIG. 15, it is preferable to design t1 and t2 based on a condition that $\lambda$ is from 500 nm through 600 nm, in order to obtain a favorable conversion efficiency throughout the visible light spectrum (from 450 nm through 650 nm).

For example, in order to obtain a birefringent layer having $\Delta n1 = 0.13$ under the condition that $\lambda = 520$ nm, t1 may be set to 2,000 nm. For example, when it is desired to more effectively convert a spectral range of from blue through green (from 430 nm through 580 nm) and a spectral range of from green through red (from 520 nm through 680 nm), t1 and t2 may be designed based on an optimum value of $\lambda$.

The specific configuration of the wavelength plate of the present invention are as described in the sections <Substrate> and <First birefringent layer and second birefringent layer> described above.

When a substrate having a rectangular shape or a square shape is used as the substrate, it is preferable that the wavelength plate satisfy formulae (12) and (13) below.

$$5° \leq \phi2 \leq 30° \tag{12}$$

$$(2\phi2+35°) \leq \phi1 \leq (2\phi2+50°) \tag{13}$$

where $\phi1$ represents an angle formed between a line segment representing the first birefringent layer's optical axis projected on the substrate and one side of the substrate, and $\phi2$ represents an angle formed between a line segment representing the second birefringent layer's optical axis projected on the substrate and one side of the substrate.

The wavelength plate according to this embodiment can be mounted on optical devices such as an optical isolator optical system described below in a manner easy for linearly polarized light to be matched with the optical axes of the birefringent layers.

Materials of the birefringent layers that can be used for the wavelength plate of the present invention are as described in the section <<Materials of birefringent layers>> described above.

Results of measurement of various optical properties of the wavelength plate of the present invention when $Ta_2O_5$ is used as a main component of the material of the obliquely-deposited birefringent layers and when $ZrO_2$ is used as a main component thereof are presented below.

Test Example 10

Wavelength dependency of $\Delta n$ when a multilayer structure was formed with $Ta_2O_5$-deposited films is as already described above (see the results in FIG. 7).

Figure 16A:
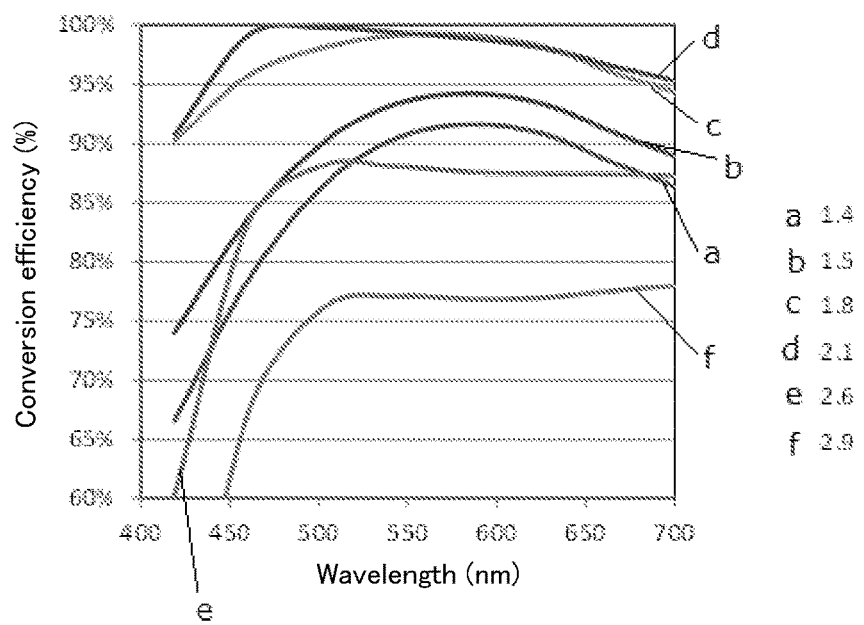
FIG. 16A is a graph plotting wavelength dependency of a conversion efficiency of a wavelength plate according to a second embodiment of the present invention made of a $Ta_2O_5$ material based on a ratio between t1 and t2.
Figure 16B:
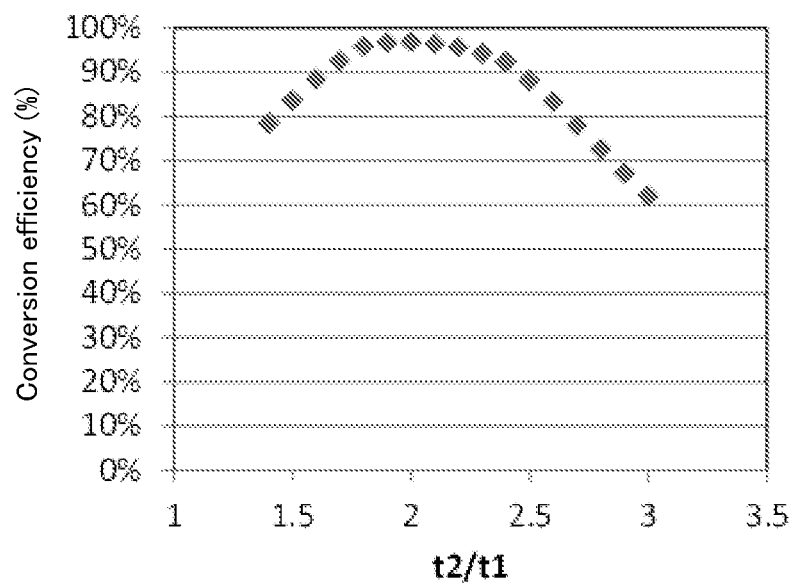
FIG. 16B is a graph plotting minimum values of a conversion efficiency, in a visible light spectrum (from 450 nm through 650 nm), of a wavelength plate according to a second embodiment of the present invention made of a $Ta_2O_5$ material relative to a ratio between t1 and t2.

FIG. 16A and FIG. 16B plot changes of the conversion efficiency of the wavelength plate of the present invention based on a ratio between t1 and t2, when the first birefringent layer and the second birefringent layer were made of $Ta_2O_5$ and t1 was designed based on $\lambda=520$ nm. Here, $\theta 1$ was set to 67.5°, and $\theta 2$ was set to 11.25°. FIG. 16A plots wavelength dependency of the conversion efficiency. FIG. 16B plots minimum values of the conversion efficiency in a visible light spectrum (from 450 nm through 650 nm). From FIG. 16B, it is known that the conversion efficiency in the visible light spectrum (from 450 nm through 650 nm) was 80% or higher in a range of $1.5 \leq t2/t1 \leq 2.6$, which means that the wavelength plate was a favorable wide-band wavelength plate functioning in that wavelength spectrum.

Test Example 11

Figure 17A:
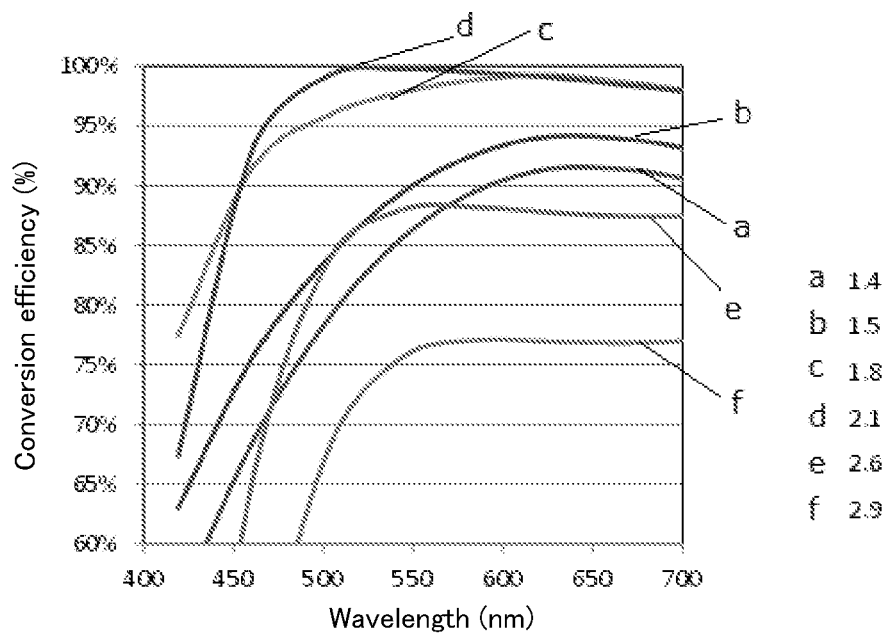
FIG. 17A is a graph plotting wavelength dependency of a conversion efficiency based on a ratio between t1 and t2 in a case where λ values in FIG. 16A are changed.
Figure 17B:
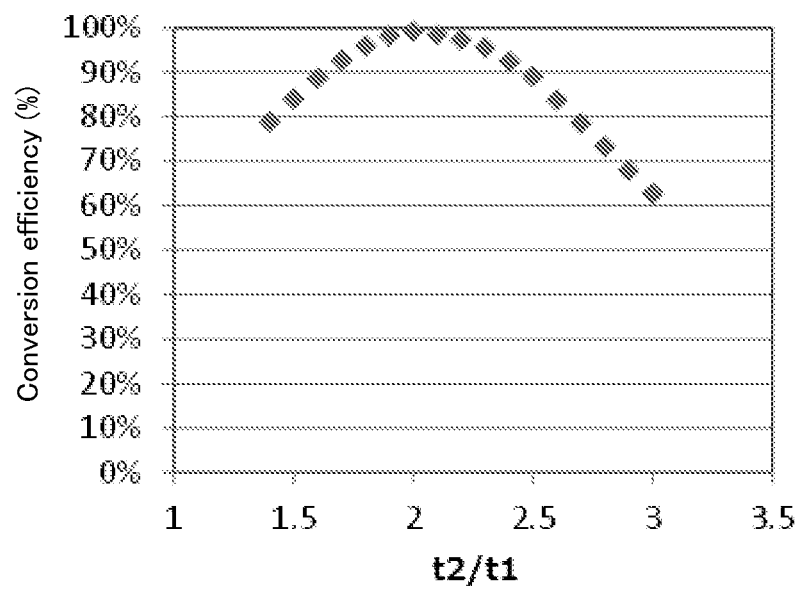
FIG. 17B is a graph plotting minimum values of a conversion efficiency in a spectral range of from green through red (from 520 nm through 670 nm) relative to a ratio between t1 and t2 in a case where λ values in FIG. 16A are changed.

FIG. 17A and FIG. 17B plot changes of the conversion efficiency of the wavelength plate of the present invention based on a ratio between t1 and t2, when the first birefringent layer and the second birefringent layer were made of $Ta_2O_5$ and t1 was designed based on $\lambda=585$ nm. Here, $\theta 1$ was set to 67.5°, and $\theta 2$ was set to 11.25°. FIG. 17A plots wavelength dependency of the conversion efficiency. FIG. 17B plots minimum values of the conversion efficiency in a spectral range of from green through red (from 520 nm through 670 nm). From FIG. 17B, it is known that the conversion efficiency in the spectral range of from green through red (from 520 nm through 670 nm) was 80% or higher in a range of $1.5 \leq t2/t1 \leq 2.6$, which means that the wavelength plate was a favorable wide-band wavelength plate functioning in that wavelength spectrum.

As presented in Test Examples 10 and 11, a wide-band wavelength plate can be obtained for a desired wavelength spectrum so long as at least t2/t1 is in the range of $1.5 \leq t2/t1 \leq 2.6$.

Text Example 12

Results of the conversion efficiency when the first birefringent layer and the second birefringent layer were made of different materials are presented below.

Wavelength dependency of $\Delta n$ when a multilayer structure was formed with $ZrO_2$-deposited films is as already described above (see the results in FIG. 10).

The first birefringent layer was made of the above-described material containing $Ta_2O_5$ as a main component, and the second birefringent layer was made of a material containing $ZrO_2$ as a main component.

Figure 18A:
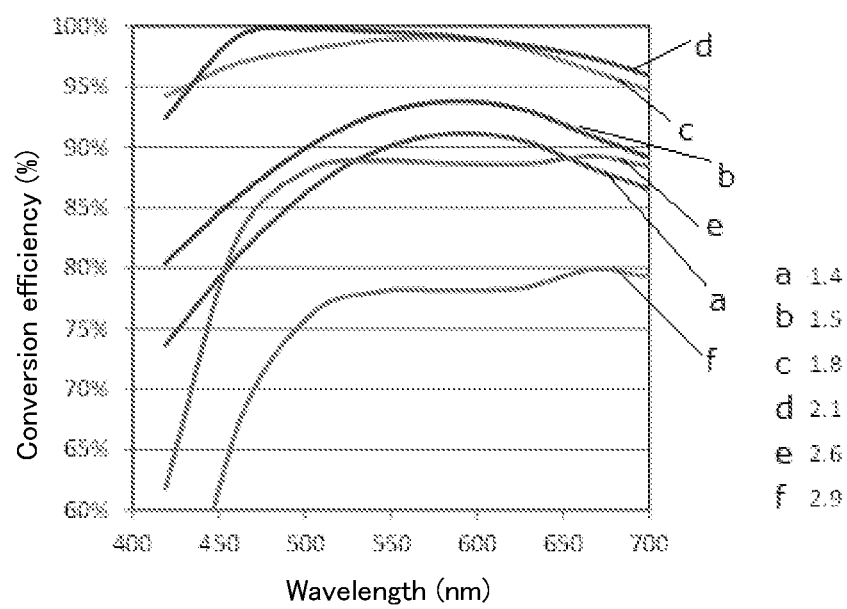
FIG. 18A is a graph plotting wavelength dependency of a conversion efficiency of a wavelength plate according to a second embodiment of the present invention in which a first birefringent layer is made of a $Ta_2O_5$ material and a second birefringent layer is made of a $ZrO_2$ material based on a ratio between ($\Delta n1 \times t1$) and ($\Delta n2 \times t2$)
Figure 18B:
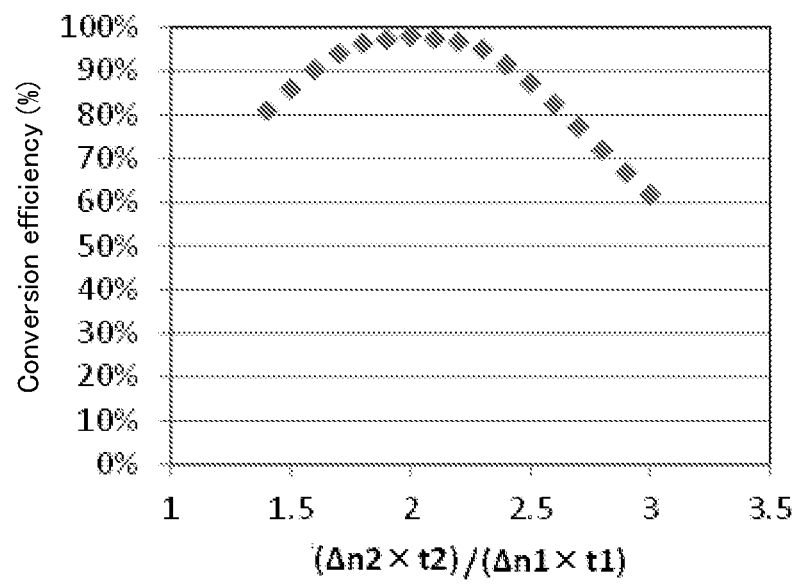
FIG. 18B is a graph plotting minimum values of a conversion efficiency, in a visible light spectrum (from 450 nm through 650 nm), of a wavelength plate according to a second embodiment of the present invention in which a first birefringent layer is made of a $Ta_2O_5$ material and a second birefringent layer is made of a $ZrO_2$ material relative to a ratio between ($\Delta n1 \times t1$) and ($\Delta n2 \times t2$)

FIG. 18A and FIG. 18B plot changes of the conversion efficiency of the wavelength plate of the present invention based on a ratio between ($\Delta n1 \times t1$) and ($\Delta n2 \times t2$) when t1 was designed based on $\lambda=520$ nm. Here, $\theta 1$ was set to 67.5°, and $\theta 2$ was set to 11.25°. FIG. 18A plots wavelength dependency of the conversion efficiency. FIG. 18B plots minimum values of the conversion efficiency in a visible light spectrum (from 450 nm through 650 nm). From FIG. 18B, it is known that the conversion efficiency in a spectral range of from green through red (from 520 nm through 670 nm) was 80% or higher in a range of $1.5 \leq (\Delta n2 \times t2)/(\Delta n1 \times t1) \leq 2.6$, which means that the wavelength plate was a favorable wide-band wavelength plate functioning in that wavelength spectrum.

Hence, a wide-band wavelength plate can be obtained for a desired wavelength spectrum so long as at least ($\Delta n2 \times t2$)/($\Delta n1 \times t1$) is in the range of $1.5 \leq (\Delta n2 \times t2)/(\Delta n1 \times t1) \leq 2.6$.

The contents described in the sections <Other layers>, <Other embodiments of the wavelength plate of the present invention>, and <Producing method> described above can also be applied to the wavelength plate according to the second embodiment of the present invention.

(Optical Device)

An optical device of the present invention includes at least a light source and the wavelength plate of the present invention, and further includes other members as needed.

Light Source

The light source is not particularly limited, and an arbitrary light source may be selected according to the purpose so long as the light source is a member configured to emit light. Examples of the light source include an extra high pressure mercury lamp configured to emit white light.

An optical isolator optical system will be described below as an example of the optical device.

Optical Isolator Optical System

Figure 19:
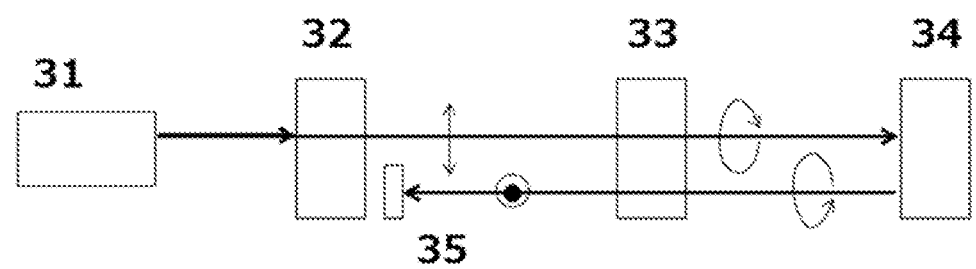
FIG. 19 is a schematic diagram illustrating an example of an optical isolator optical system.

FIG. 19 illustrates a schematic diagram of an example of an optical isolator optical system. In FIG. 19, the reference sign 31 indicates a light source, the reference sign 32 indicates a polarized light filter, the reference sign 33 indicates the wavelength plate of the present invention, the reference sign 34 indicates a mirror, and the reference sign 35 indicates a retardation detector.

In this optical isolator optical system, the wavelength plate is used in a mode that incident light passes through the wavelength plate twice in a reciprocating manner.

Here, when the wavelength plate according to the first embodiment is used, it is preferable to dispose the wavelength plate such that incident light becomes incident from the first birefringent layer, not from the second birefringent layer.

On the other hand, when the wavelength plate according to the second embodiment is used, it is preferable to dispose the wavelength plate such that incident light becomes incident from the second birefringent layer, not from the first birefringent layer.

Further, as described above, it is preferable that the wavelength plate to be mounted on the optical isolator optical system be a wavelength plate including birefringent layers of which approximate index ellipsoid has an optical axis parallel with the substrate, because this makes it easy to obtain a bilaterally-symmetric optical property from inclined incident light.

Furthermore, it is preferable that the wavelength plate to be mounted on the optical isolator optical system be a wavelength plate that uses a substrate having a rectangular shape or a square shape and satisfies formulae (5) and (6) below when (A) it is a wavelength plate according to the first embodiment, or formulae (12) and (13) below when (B) it is a wavelength plate according to the second embodiment.

$$5° \leq \phi 1 \leq 30° \tag{5}$$

$$(2\phi 1 + 35°) \leq \phi 2 \leq (2\phi 1 + 50°) \tag{6}$$

$$5° \leq \phi 2 \leq 30° \tag{12}$$

$$(2\phi 2 + 35°) \leq \phi 1 \leq (2\phi 2 + 50°) \tag{13}$$

where φ1 represents an angle formed between a line segment representing the first birefringent layer's optical axis projected on the substrate and one side of the substrate, and φ2 represents an angle formed between a line segment representing the second birefringent layer's optical axis projected on the substrate and one side of the substrate.

The reason why this is preferable is that linearly polarized light that is incident to a quarter wavelength plate is often parallel with one side of the substrate, and hence the linearly polarized light can be easily matched with the optical axes of the birefringent layers if the wavelength plate satisfies the formulae (5) and (6) above or the formulae (12) and (13) above.

EXAMPLES

Examples of the present invention will be described below. However, the present invention is not limited to these Examples by any means.

Example 1

A material to be deposited containing $Ta_2O_5$ as a main component was obliquely deposited over a glass substrate in a state that (a) the deposition source was at 70° from a direction normal to the substrate, to thereby form a first deposited film. Next, oblique deposition was performed along (b) an opposite direction that was shifted by 180° in the in-plane direction of the substrate at the same deposition angle of 70°, to thereby form a second deposited film. The processes of (a) and (b) were repeated alternately, to thereby form a first birefringent layer having a multilayer structure. The first birefringent layer was formed to have a thickness of 1,848 nm (264 layers). Here, the film formation was performed by adjusting the deposition direction and the direction of the substrate such that an angle between a line segment representing the deposition direction projected on the substrate in plane and incident linearly polarized light would be 12°. By the film formation performed at 12° from a side of the substrate, the first birefringent layer was formed to obtain θ1 of 12° when linearly polarized light parallel with the substrate surface would be incident.

Next, a deposited film for the 265th layer was formed by performing oblique deposition along a direction reached by rotating the substrate by 57° in the in-plane direction of the substrate from the deposition direction along which formation of the first birefringent layer was performed (the reached direction was a direction that would be at 69° from incident linearly polarized light). Next, oblique deposition was performed along an opposite direction that was shifted by 180° in the in-plane direction of the substrate, to thereby form a deposited film for the 266th layer. These processes were repeated alternately, to thereby form a second birefringent layer having a multilayer structure. The second birefringent layer was formed to have a thickness of 924 nm (132 layers). By the film formation performed at 69° from a side of the substrate, the second birefringent layer was formed to obtain θ2 of 69° when linearly polarized light parallel with the substrate surface would be incident.

After the birefringent layers were formed, decolorization and an anneal treatment at 200° C. for evaporating a water content adsorbed between pillared tissues were performed.

After this, antireflection films were formed over the second birefringent layer and the back surface of the substrate (the back surface being a surface of the substrate opposite to the surface over which the birefringent layers were formed).

Figure 20A:
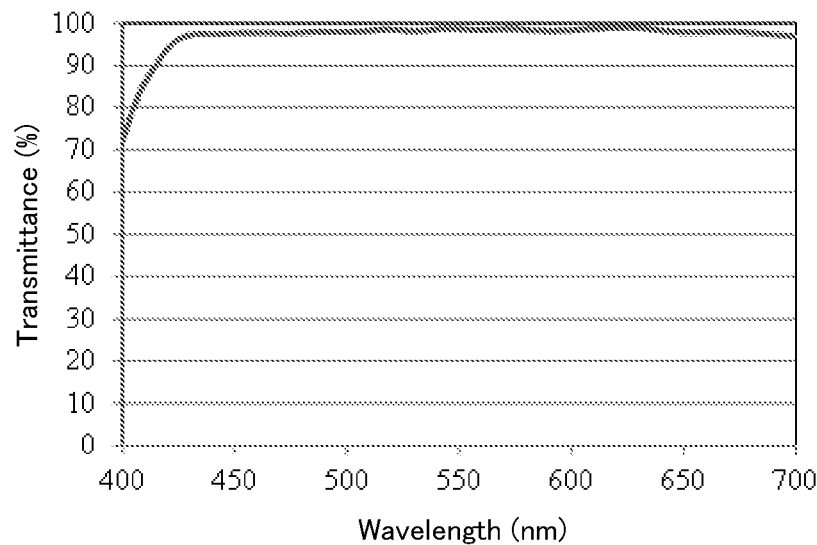
FIG. 20A is a graph plotting measurements of transmittance of a wavelength plate of Example 1.
Figure 20B:
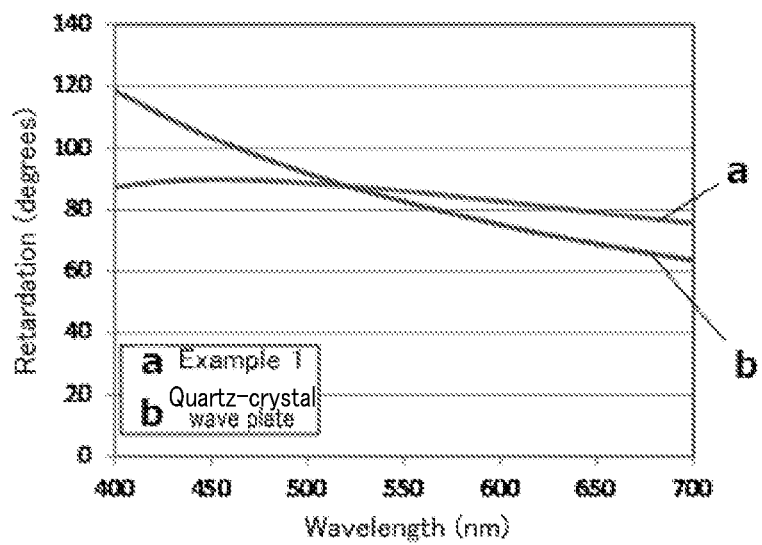
FIG. 20B is a graph plotting measurements of retardation by a wavelength plate of Example 1.

FIG. 20A and FIG. 20B plot results of measurements of transmittance and retardation of the wavelength plate produced in the manner described above. The result of measurement of retardation is plotted together with a characteristic of a quarter wavelength plate formed of a zero-order quartz-crystal wavelength plate. It is known that emitted light that had been rotated by ¼ of the wavelength was obtained from the wavelength plate of the present invention in a wide band.

Figure 21A:
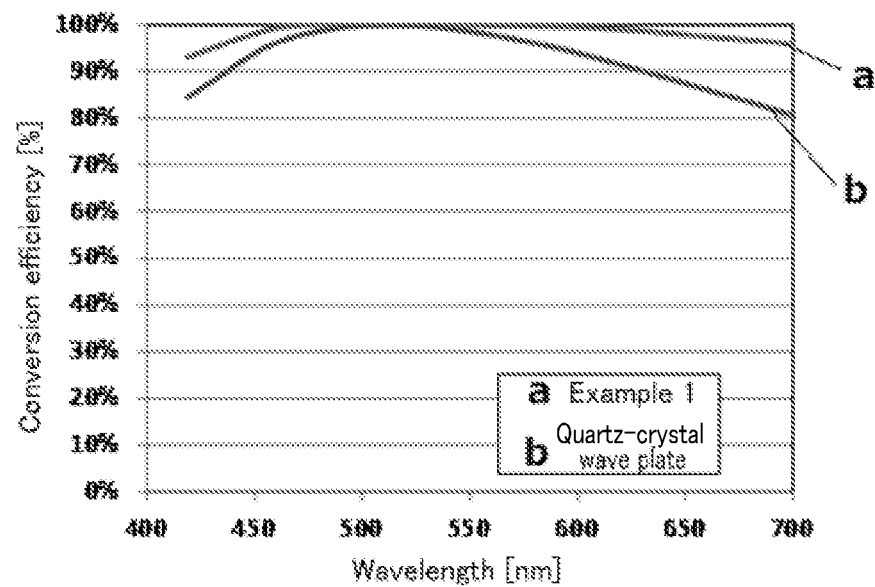
FIG. 21A is a graph plotting measurements of a conversion efficiency of a wavelength plate of Example 1.

FIG. 21A plots results of measurement of a conversion efficiency of the wavelength plate when the wavelength plate was disposed in the optical isolator optical system illustrated in FIG. 19 such that incident linearly polarized light would be incident from the first birefringent layer, where the conversion efficiency is a rate at which the linearly polarized light that had been rotated by 90° was emitted when the incident linearly polarized light had passed through the wavelength plate twice in a reciprocating manner.

The conversion efficiency was measured with RETS-100 available from Otsuka Electronics Co., Ltd.

From the results, it is known that the wavelength plate of the present invention exhibited a favorable conversion efficiency of 90% or higher throughout the visible light spectrum.

Figure 21B:
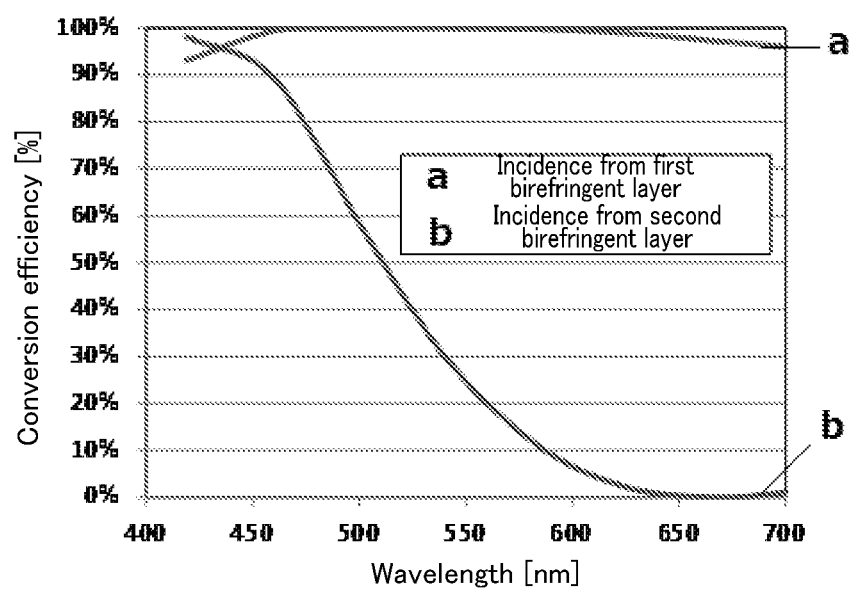
FIG. 21B is a graph presenting difference in a conversion efficiency between cases where incident linearly polarized light is made incident to a wavelength plate of Example 1 from different sides.

FIG. 21B plots results of measurement of conversion efficiencies of the wavelength plate of the respective cases where the wavelength plate was disposed in the optical isolator optical system illustrated in FIG. 19 such that incident linearly polarized light would be incident from the first birefringent layer and from the second birefringent layer, respectively.

From the results, it is known that the conversion efficiency was much lower when the light was incident from the second birefringent layer. A favorable conversion function is exhibited by making light incident from the first birefringent layer.

Comparative Example 1

A material to be deposited containing $Ta_2O_5$ as a main component was obliquely deposited over a glass substrate in a state that (a) the deposition source was at 70° from a direction normal to the substrate, to thereby form a first deposited film. Next, oblique deposition was performed along (b) an opposite direction that was shifted by 180° in the in-plane direction of the substrate at the same deposition angle of 70°, to thereby form a second deposited film. The processes of (a) and (b) were repeated alternately, to thereby form a first birefringent layer having a multilayer structure. The first birefringent layer was formed to have a thickness of 1,848 nm (264 layers). Here, the film formation was performed by adjusting the deposition direction and the direction of the substrate such that an angle between a line segment representing the deposition direction projected on the substrate in plane and incident linearly polarized light would be 76°. By the film formation performed at 76° from a side of the substrate, the first birefringent layer was formed to obtain θ1 of 76° when linearly polarized light parallel with the substrate surface would be incident.

Next, a deposited film for the 265th layer was formed by performing oblique deposition along a direction reached by rotating the substrate by −31° in the in-plane direction of the substrate from the deposition direction along which formation of the first birefringent layer was performed (the reached direction was a direction that would be at 45° from incident linearly polarized light). Next, oblique deposition was performed along an opposite direction that was shifted by 180° in the in-plane direction of the substrate, to thereby form a deposited film for the 266th layer. These processes were repeated alternately, to thereby form a second birefringent layer having a multilayer structure. The second birefringent layer was formed to have a thickness of 924 nm (132 layers). By the film formation performed at 45° from a side of the substrate, the second birefringent layer was formed to obtain θ2 of 45° when linearly polarized light parallel with the substrate surface would be incident.

After the birefringent layers were formed, decolorization and an anneal treatment at 200° C. for evaporating a water content adsorbed between pillared tissues were performed.

After this, antireflection films were formed over the second birefringent layer and the back surface of the substrate (the back surface being a surface of the substrate opposite to the surface over which the birefringent layers were formed).

Figure 22A:
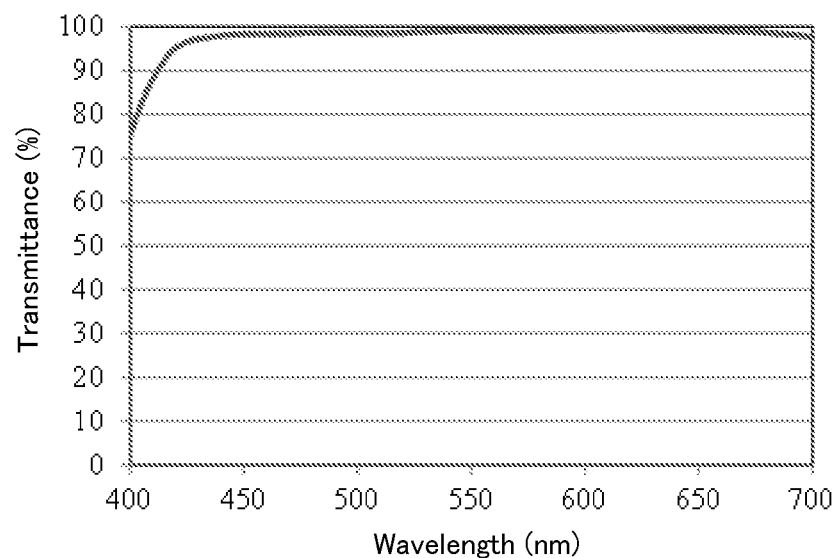
FIG. 22A is a graph plotting measurements of transmittance of a wavelength plate of Comparative Example 1.
Figure 22B:
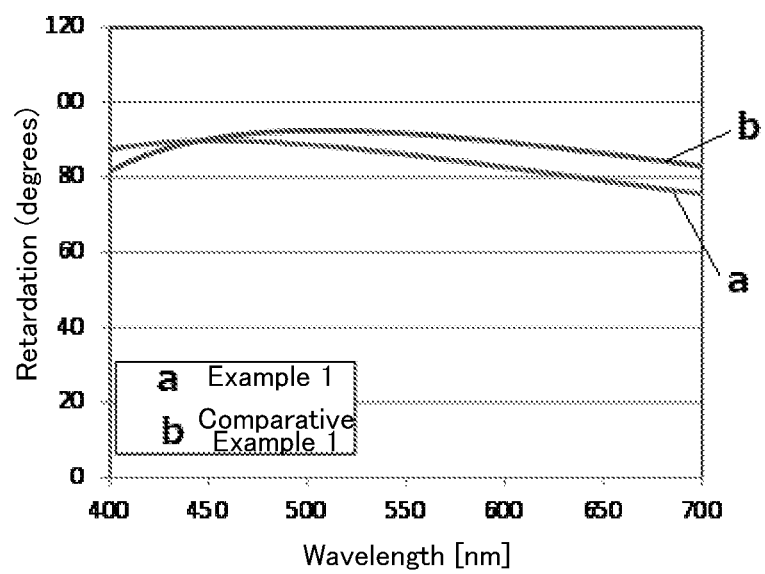
FIG. 22B is a graph plotting measurements of retardation by a wavelength plate of Comparative Example 1.

FIG. 22A and FIG. 22B plot results of measurements of transmittance and retardation of the wavelength plate produced in the manner described above. The result of measurement of retardation is plotted together with the characteristic of the wavelength plate of Example 1. It is known that emitted light that had been rotated by ¼ of the wavelength was obtained in both of Example and Comparative Example in a wide band.

Figure 23:
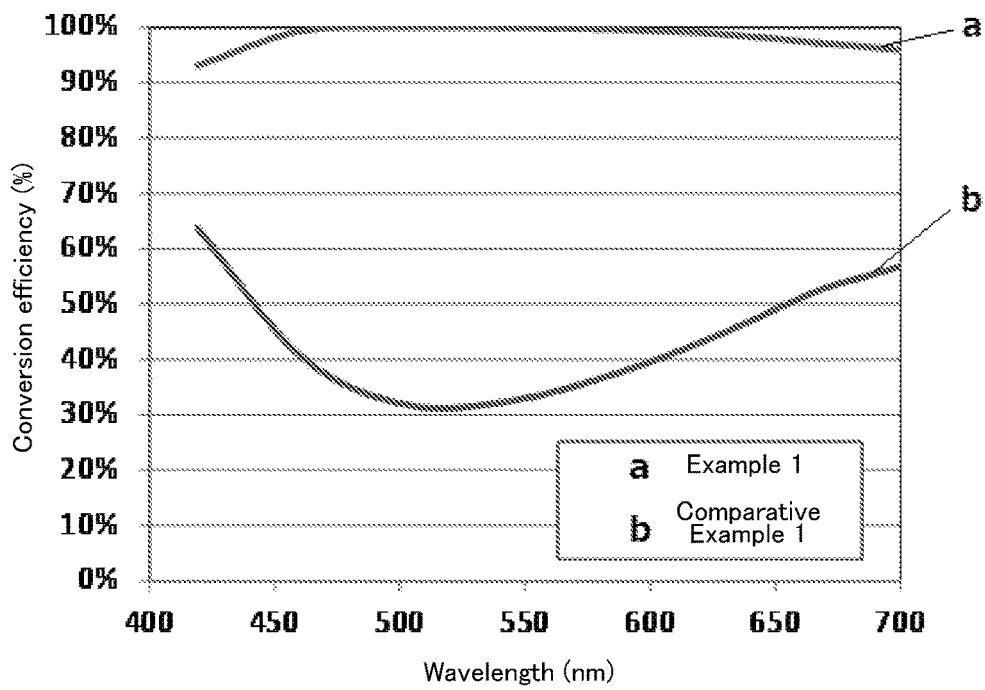
FIG. 23 is a graph plotting measurements of a conversion efficiency of a wavelength plate of Comparative Example 1.

FIG. 23 plots results of measurement of a conversion efficiency of the wavelength plate when the wavelength plate was disposed in the optical isolator optical system illustrated in FIG. 19 such that incident linearly polarized light would be incident from the first birefringent layer, where the conversion efficiency is a rate at which the linearly polarized light that had been rotated by 90° was emitted when the incident linearly polarized light had passed through the wavelength plate twice in a reciprocating manner. From the results, it is known that a characteristic of a significantly-wide-band wavelength plate was obtained in Example 1, whereas the conversion efficiency was much lower in Comparative Example 1.

As described above, even a wide-band quarter wavelength plate may not necessarily be able to efficiently obtain linearly polarized light that has been rotated by 90° when incident linearly polarized light has passed through the wavelength plate twice in a reciprocating manner. However, the wavelength plate of the present invention used in the mode presented in Example 1 was an inorganic wide-band quarter wavelength plate and exhibited a high conversion efficiency.

Example 2

Figure 24:
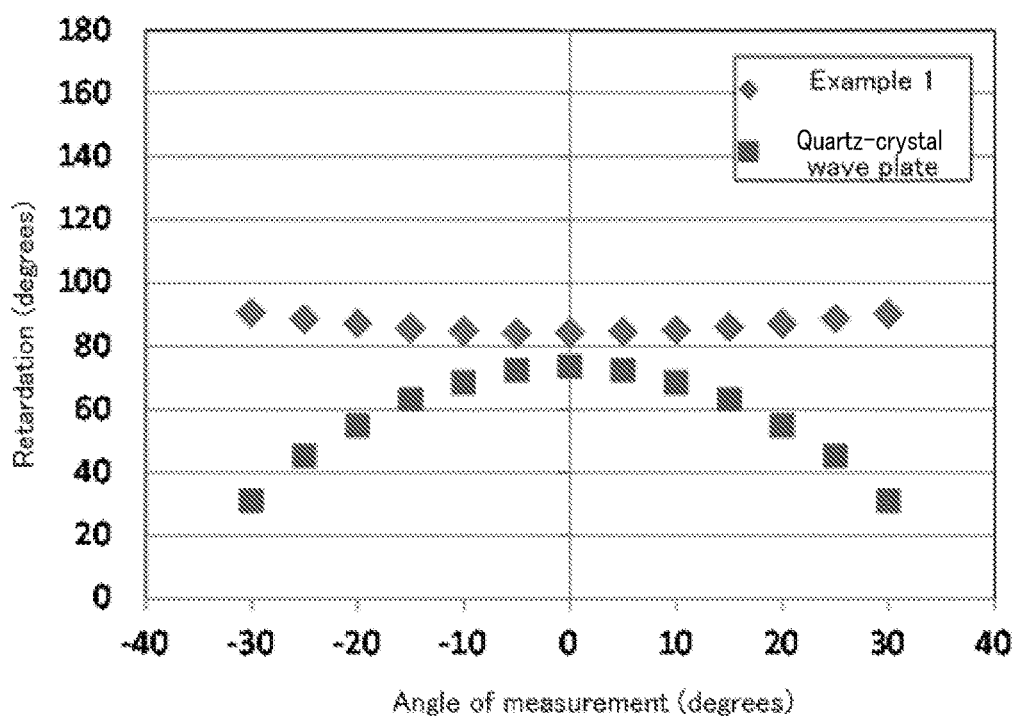
FIG. 24 is a graph plotting measurements of retardation by a wavelength plate of Example 1 when the angle of the wavelength plate is varied.

Retardation of light emitted from the wavelength plate of Example 1 was measured by varying the angle of the wavelength plate under a condition that λ=550 nm. FIG. 24 plots the angle dependency of the wavelength plate. The result of a quartz-crystal quarter wavelength plate is plotted together. From the results, it is known that retardation of the quartz-crystal wavelength plate decreased as the angle increased, whereas retardation of the wavelength plate of Example 1 changed little as the angle increased, which means that the wavelength plate of Example 1 functions effectively also for incident light having a dispersion.

Example 3

A material to be deposited containing $Ta_2O_5$ as a main component was obliquely deposited over a glass substrate in a state that (a) the deposition source was at 70° from a direction normal to the substrate, to thereby form a first deposited film. Next, oblique deposition was performed along (b) an opposite direction that was shifted by 180° in the in-plane direction of the substrate at the same deposition angle of 70°, to thereby form a second deposited film. The processes of (a) and (b) were repeated alternately, to thereby form a first birefringent layer having a multilayer structure. The first birefringent layer was formed to have a thickness of 924 nm (132 layers). Here, the film formation was performed by adjusting the deposition direction and the direction of the substrate such that an angle between a line segment representing the deposition direction projected on the substrate in plane and incident linearly polarized light would be 68°. By the film formation performed at 68° from a side of the substrate, the first birefringent layer was formed to obtain θ1 of 68° when linearly polarized light parallel with the substrate surface would be incident.

Next, a deposited film for the 133rd layer was formed by performing oblique deposition along a direction reached by rotating the substrate by −56° in the in-plane direction of the substrate from the deposition direction along which formation of the first birefringent layer was performed (the reached direction was a direction that would be at 12° from incident linearly polarized light). Next, oblique deposition was performed along an opposite direction that was shifted by 180° in the in-plane direction of the substrate, to thereby form a deposited film for the 134th layer. These processes were repeated alternately, to thereby form a second birefringent layer having a multilayer structure. The second birefringent layer was formed to have a thickness of 1,848 nm (264 layers). By the film formation performed at 12° from a side of the substrate, the second birefringent layer was formed to obtain θ2 of 12° when linearly polarized light parallel with the substrate surface would be incident.

After the birefringent layers were formed, decolorization and an anneal treatment at 200° C. for evaporating a water content adsorbed between pillared tissues were performed.

After this, antireflection films were formed over the second birefringent layer and the back surface of the substrate (the back surface being a surface of the substrate opposite to the surface over which the birefringent layers were formed).

Figure 25A:
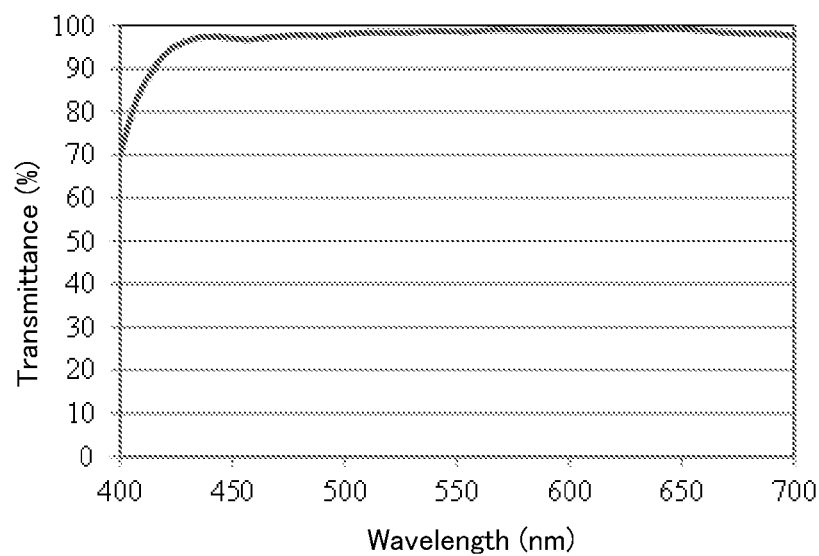
FIG. 25A is a graph plotting measurements of transmittance of a wavelength plate of Example 3.
Figure 25B:
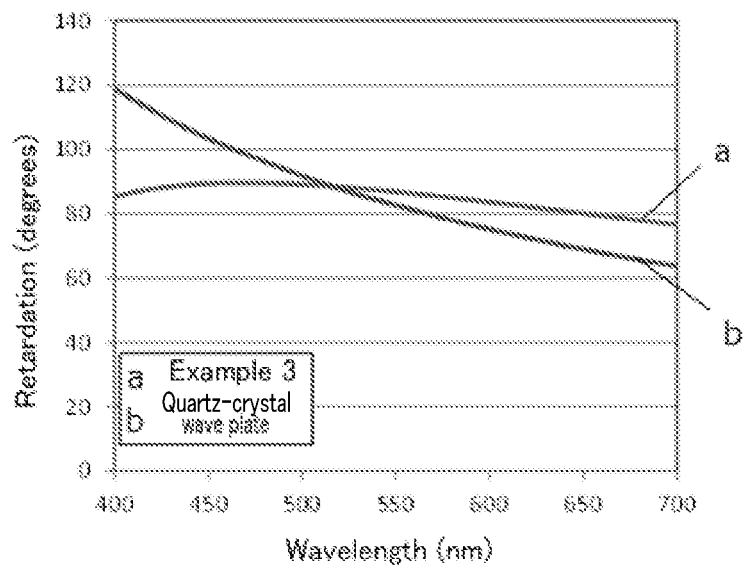
FIG. 25B is a graph plotting measurements of retardation by a wavelength plate of Example 3.

FIG. 25A and FIG. 25B plot results of measurements of transmittance and retardation of the wavelength plate produced in the manner described above. The result of measurement of retardation is plotted together with a characteristic of a quarter wavelength plate formed of a zero-order quartz-crystal wavelength plate. It is known that emitted light that had been rotated by ¼ of the wavelength was obtained from the wavelength plate of the present invention in a wide band.

Figure 26A:
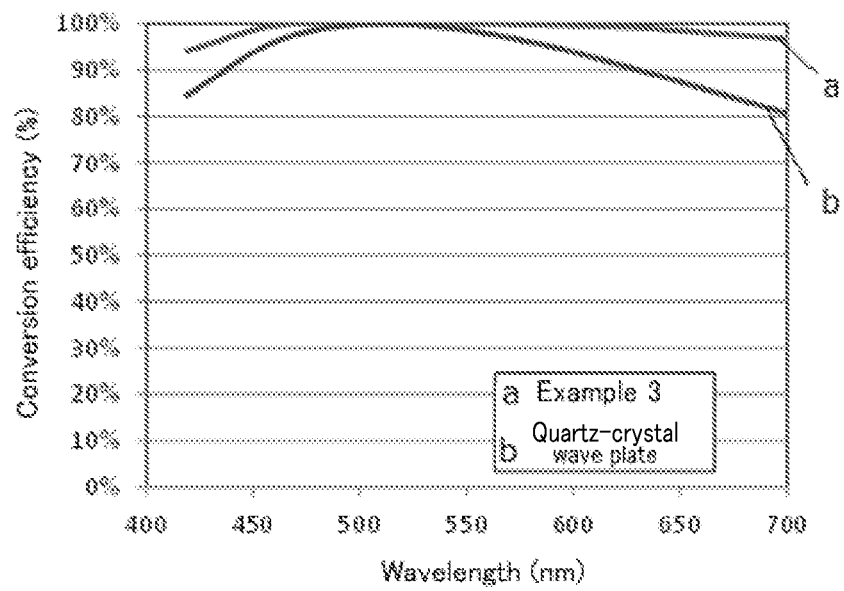
FIG. 26A is a graph plotting measurements of a conversion efficiency of a wavelength plate of Example 3.

FIG. 26A plots results of measurement of a conversion efficiency of the wavelength plate when the wavelength plate was disposed in the optical isolator optical system illustrated in FIG. 19 such that incident linearly polarized light would be incident from the second birefringent layer, where the conversion efficiency is a rate at which the linearly polarized light that had been rotated by 90° was emitted when the incident linearly polarized light had passed through the wavelength plate twice in a reciprocating manner.

The conversion efficiency was measured with RETS-100 available from Otsuka Electronics Co., Ltd.

From the results, it is known that the wavelength plate of the present invention exhibited a favorable conversion efficiency of 90% or higher throughout the visible light spectrum.

Figure 26B:
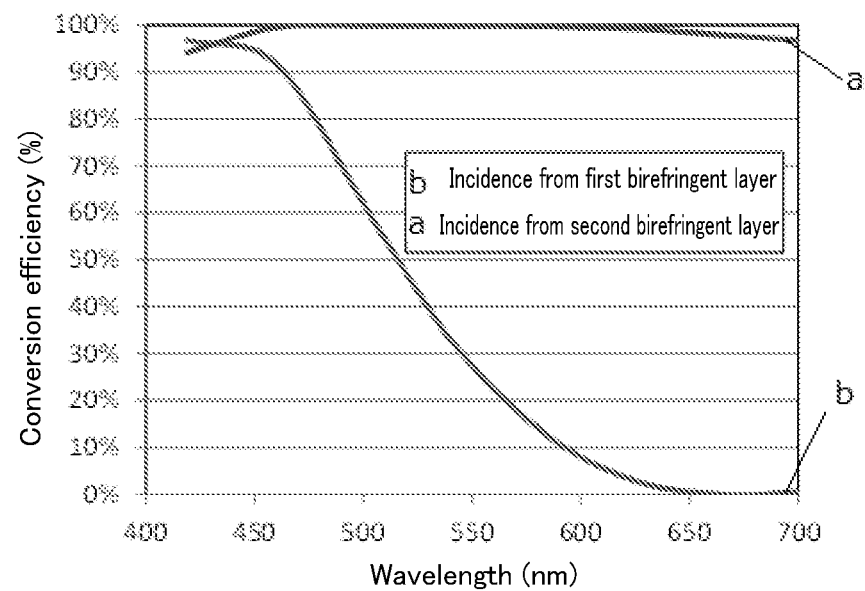
FIG. 26B is a graph presenting difference in a conversion efficiency between cases where incident linearly polarized light is made incident to a wavelength plate of Example 3 from different sides.

FIG. 26B plots results of measurement of conversion efficiencies of the wavelength plate of the respective cases where the wavelength plate was disposed in the optical isolator optical system illustrated in FIG. 19 such that incident linearly polarized light would be incident from the second birefringent layer and from the first birefringent layer, respectively.

From the results, it is known that the conversion efficiency was much lower when the light was incident from the first birefringent layer. A favorable conversion function is exhibited by making light incident from the second birefringent layer.

Example 4

Figure 27:
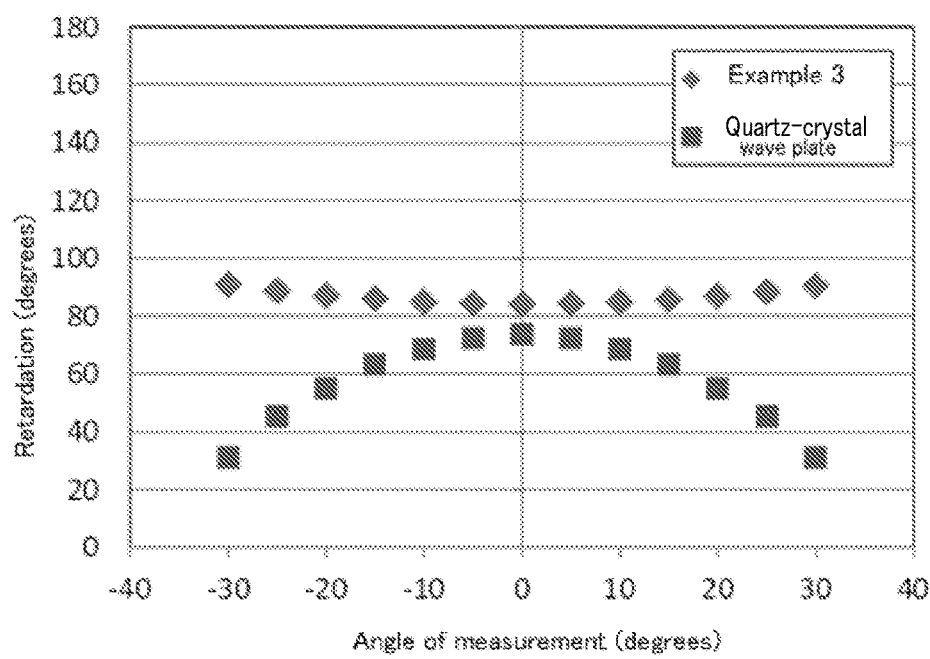
FIG. 27 is a graph plotting measurements of retardation by a wavelength plate of Example 3 when the angle of the wavelength plate is varied.

Retardation of light emitted from the wavelength plate of Example 3 was measured by varying the angle of the wavelength plate under a condition that λ=550 nm. FIG. 27 plots the angle dependency of the wavelength plate. The result of a quartz-crystal quarter wavelength plate is plotted together. From the results, it is known that retardation of the quartz-crystal wavelength plate decreased as the angle increased, whereas retardation of the wavelength plate of Example 3 changed little as the angle increased, which means that the wavelength plate of Example 3 functions effectively also for incident light having a dispersion.

Comparative Example 2

A material to be deposited containing $Ta_2O_5$ as a main component was obliquely deposited over a glass substrate in a state that (a) the deposition source was at 70° from a direction normal to the substrate, to thereby form a first deposited film. Next, oblique deposition was performed along (b) an opposite direction that was shifted by 180° in the in-plane direction of the substrate at the same deposition angle of 70°, to thereby form a second deposited film. The processes of (a) and (b) were repeated alternately, to thereby form a first birefringent layer having a multilayer structure. The first birefringent layer was formed to have a thickness of 924 nm (132 layers). Here, the film formation was performed by adjusting the deposition direction and the direction of the substrate such that an angle between a line segment representing the deposition direction projected on the substrate in plane and incident linearly polarized light would be 45°. Next, a material to be deposited containing $ZrO_2$ as a main component was obliquely deposited along a direction reached by rotating the substrate by 90° in the in-plane direction of the substrate from the deposition direction along which formation of the first birefringent layer was performed, to thereby form a deposited film for the 133rd layer. Next, oblique deposition was performed along an opposite direction that was shifted by 180° in the in-plane direction of the substrate, to thereby form a deposited film for the 134th layer. These processes were repeated alternately, to thereby form a second birefringent layer having a multilayer structure. The second birefringent layer was formed to have a thickness of 3,528 nm (504 layers).

After the birefringent layers were formed, decolorization and an anneal treatment at 200° C. for evaporating a water content adsorbed between pillared tissues were performed.

After this, antireflection films were formed over the second birefringent layer and the back surface of the substrate (the back surface being a surface of the substrate opposite to the surface over which the birefringent layers were formed).

Figure 28:
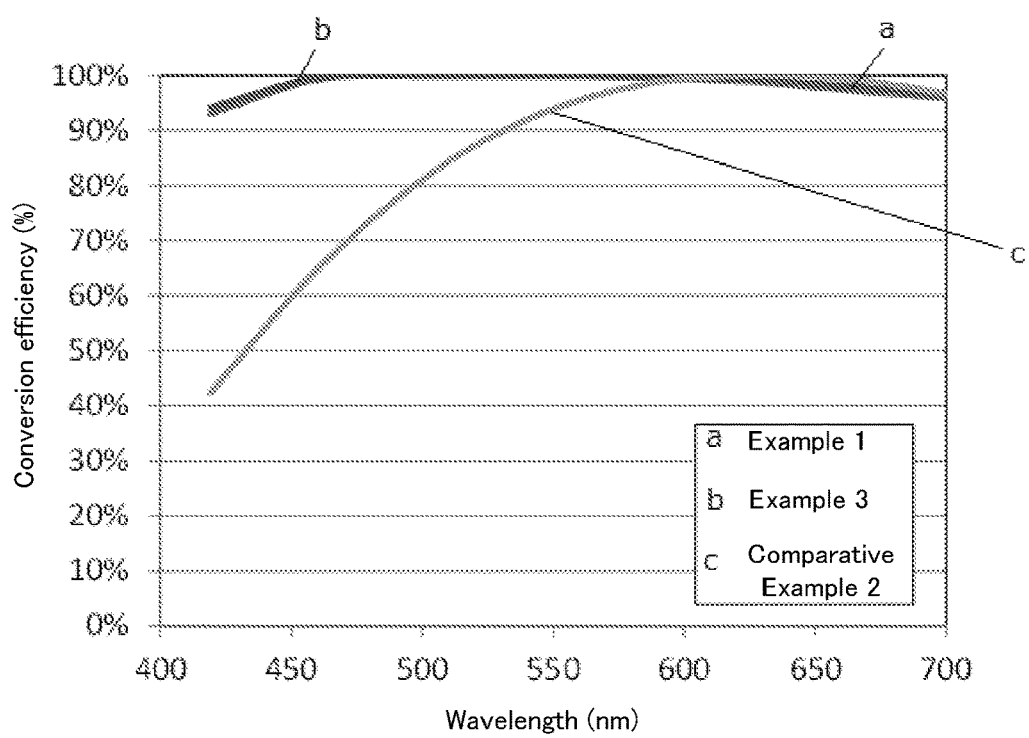
FIG. 28 is a graph plotting measurements of a conversion efficiency of a wavelength plate of Comparative Example 2.

FIG. 28 plots results of measurement of a conversion efficiency of the wavelength plate produced in the manner described above when the wavelength plate was disposed in the optical isolator optical system illustrated in FIG. 19 such that incident linearly polarized light would be incident from the first birefringent layer, where the conversion efficiency is a rate at which the linearly polarized light that had been rotated by 90° was emitted when the incident linearly polarized light had passed through the wavelength plate twice in a reciprocating manner. For comparison, the results of measurement of the conversion efficiencies of Examples 1 and 3 are also plotted.

From the results, the conversion efficiency of the film configuration of Comparative Example 2 dropped to 80% or lower. Therefore, Comparative Example 2 cannot be said to have a sufficient wide-band characteristic.

As described above, it could be confirmed from the results of Examples that the wavelength plate of the present invention was an inorganic wide-band quarter wavelength plate having excellent heat resistance, a high conversion efficiency, and a small variation in the degree of retardation depending on the angle of incident light.

What is claimed is:

1. A wavelength plate, comprising:
a first birefringent layer; and
a second birefringent layer,
the first birefringent layer and the second birefringent layer being laminated such that an in-plane direction of an optical axis of the first birefringent layer and an in-plane direction of an optical axis of the second birefringent layer cross each other,
wherein the wavelength plate satisfies formulae (1), (2), (3), and (4) below,
wherein at least one birefringent layer of the first birefringent layer and the second birefringent layer is an obliquely-deposited birefringent layer formed by oblique deposition,
wherein the first birefringent layer and the second birefringent layer are physically in contact with each other,
wherein the wavelength plate has only one substrate, and
wherein the obliquely-deposited birefringent layer is formed over the substrate, $$\Delta n1 \times t1 = \lambda/2 \qquad (1)$$

$$1.7 \leq (\Delta n1 \times t1)/(\Delta n2 \times t2) \leq 2.7 \qquad (2)$$

$$5° \leq \theta1 \leq 30° \qquad (3)$$

$$(2\theta1+35°) \leq \theta2 \leq (2\theta1+50°) \qquad (4)$$

where $\Delta n1$ represents birefringence of the first birefringent layer, $\Delta n2$ represents birefringence of the second birefringent layer, t1 represents a film thickness of the first birefringent layer, t2 represents a film thickness of the second birefringent layer, $\theta1$ represents an angle between the optical axis of the first birefringent layer and incident linearly polarized light, $\theta2$ represents an angle between the optical axis of the second birefringent layer and incident linearly polarized light, and λ represents a predetermined value in a range of wavelengths of incident light.

2. The wavelength plate according to claim 1,
wherein the wavelength plate has a conversion efficiency of 80% or higher in a visible light spectrum, where the conversion efficiency is a rate at which linearly polarized light that has been rotated by 90° is emitted from the wavelength plate when the incident linearly polarized light has passed through the wavelength plate twice in a reciprocating manner.

3. The wavelength plate according to claim 1,
wherein an optical axis of an index ellipsoid approximated by the obliquely-deposited birefringent layer is parallel with the substrate.

4. The wavelength plate according to claim 1,
wherein the substrate has a shape of a rectangle or a square, and
wherein the wavelength plate satisfies formulae (5) and (6) below, $$5° \leq \phi1 \leq 30° \quad (5)$$

$$(2\phi1+35°) \leq \phi2 \leq (2\phi1+50°) \quad (6)$$

where $\phi1$ represents an angle formed between a line segment representing the first birefringent layer's optical axis projected on the substrate and one side of the substrate, and $\phi2$ represents an angle formed between a line segment representing the second birefringent layer's optical axis projected on the substrate and one side of the substrate.

5. The wavelength plate according to claim 1,
wherein the obliquely-deposited birefringent layer comprises a repeated multilayer structure that comprises as constituting units, two kinds of obliquely-deposited films deposited along different deposition directions, and
wherein each of the obliquely-deposited films has a thickness of $\lambda/4$ or less.

6. The wavelength plate according to claim 1,
wherein a constituent material of the obliquely-deposited birefringent layer is an inorganic material that comprises an oxide of any one of Si, Nb, Zr, Ti, La, Ta, and Al.

7. An optical device, comprising:
a light source configured to emit light; and
the wavelength plate according to claim 1.

8. The optical device according to claim 7,
wherein the wavelength plate is disposed such that incident linearly polarized light passes through the wavelength plate twice in a reciprocating manner,
wherein the incident linearly polarized light passes through the wavelength plate for a first time from the first birefringent layer, and
wherein the incident linearly polarized light passes through the wavelength plate for a second time from the second birefringent layer.

9. The wavelength plate according to claim 1,
wherein the first birefringent layer and the second birefringent layer are made of a same material, and
wherein a ratio between the film thickness of the first birefringent layer and the film thickness of the second birefringent layer satisfies a formula (7) below, $$1.7 \leq t1/t2 \leq 2.7. \quad (7)$$

10. The wavelength plate according to claim 1,
wherein the birefringence of the birefringent layers is 0.07 or greater.

11. A wavelength plate, comprising:
a first birefringent layer; and
a second birefringent layer,
the first birefringent layer and the second birefringent layer being laminated such that an in-plane direction of an optical axis of the first birefringent layer and an in-plane direction of an optical axis of the second birefringent layer cross each other,
wherein the wavelength plate satisfies formulae (8), (9), (10), and (11) below,
wherein at least one birefringent layer of the first birefringent layer and the second birefringent layer is an obliquely-deposited birefringent layer formed by oblique deposition,
wherein the first birefringent layer and the second birefringent layer are physically in contact with each other,
wherein the wavelength plate has only one substrate, and
wherein the obliquely-deposited birefringent layer is formed over the substrate, $$\Delta n1 \times t1 = \lambda/4 \quad (8)$$

$$1.5 \leq (\Delta n2 \times t2)/(\Delta n1 \times t1) \leq 2.6 \quad (9)$$

$$5° \leq \theta2 \leq 30° \quad (10)$$

$$(2\theta2+35°) \leq \theta1 \leq (2\theta2+50°) \quad (11)$$

where $\Delta n1$ represents birefringence of the first birefringent layer, $\Delta n2$ represents birefringence of the second birefringent layer, t1 represents a film thickness of the first birefringent layer, t2 represents a film thickness of the second birefringent layer, $\theta1$ represents an angle between the optical axis of the first birefringent layer and incident linearly polarized light, $\theta2$ represents an angle between the optical axis of the second birefringent layer and incident linearly polarized light, and $\lambda$ represents a predetermined value in a range of wavelengths of incident light.

12. The wavelength plate according to claim 11,
wherein the wavelength plate has a conversion efficiency of 80% or higher in a visible light spectrum, where the conversion efficiency is a rate at which linearly polarized light that has been rotated by 90° is emitted from the wavelength plate when the incident linearly polarized light has passed through the wavelength plate twice in a reciprocating manner.

13. The wavelength plate according to claim 11,
wherein an optical axis of an index ellipsoid approximated by the obliquely-deposited birefringent layer is parallel with the substrate.

14. The wavelength plate according to claim 11,
wherein the substrate has a shape of a rectangle or a square, and
wherein the wavelength plate satisfies formulae (12) and (13) below, $$5° \leq \phi2 \leq 30° \quad (12)$$

$$(2\phi2+35°) \leq \phi1 \leq (2\phi2+50°) \quad (13)$$

where $\phi1$ represents an angle formed between a line segment representing the first birefringent layer's optical axis projected on the substrate and one side of the substrate, and $\phi2$ represents an angle formed between a line segment representing the second birefringent layer's optical axis projected on the substrate and one side of the substrate.

15. The wavelength plate according to claim 11,
wherein the obliquely-deposited birefringent layer comprises a repeated multilayer structure that comprises as constituting units, two kinds of obliquely-deposited films deposited along different deposition directions, and
wherein each of the obliquely-deposited films has a thickness of $\lambda/4$ or less.

16. The wavelength plate according to claim 11,
wherein a constituent material of the obliquely-deposited birefringent layer is an inorganic material that comprises an oxide of any one of Si, Nb, Zr, Ti, La, Ta, and Al.

17. An optical device, comprising:
a light source configured to emit light; and
the wavelength plate according to claim 11.

18. The optical device according to claim 17,
wherein the wavelength plate is disposed such that incident linearly polarized light passes through the wavelength plate twice in a reciprocating manner,
wherein the incident linearly polarized light passes through the wavelength plate for a first time from the second birefringent layer, and
wherein the incident linearly polarized light passes through the wavelength plate for a second time from the first birefringent layer.

19. The wavelength plate according to claim 11,
wherein the first birefringent layer and the second birefringent layer are made of a same material, and
wherein a ratio between the film thickness of the first birefringent layer and the film thickness of the second birefringent layer satisfies a formula (14) below, $$1.5 \leq t2/t1 \leq 2.6. \tag{14}$$

20. The wavelength plate according to claim 11,
wherein the birefringence of the birefringent layers is 0.07 or greater.

* * * * *